(12) United States Patent
Chatterjee et al.

(10) Patent No.: US 11,533,675 B2
(45) Date of Patent: Dec. 20, 2022

(54) SYSTEM AND METHODS FOR SYSTEM OPERATION FOR NARROWBAND-LTE FOR CELLULAR IOT

(71) Applicant: Apple Inc., Cupertino, CA (US)

(72) Inventors: Debdeep Chatterjee, San Jose, CA (US); Gang Xiong, Portland, OR (US); Mohammad Mamunur Rashid, Hillsboro, OR (US); Tao Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/746,771

(22) PCT Filed: Apr. 1, 2016

(86) PCT No.: PCT/US2016/025750
§ 371 (c)(1),
(2) Date: Jan. 22, 2018

(87) PCT Pub. No.: WO2017/019133
PCT Pub. Date: Feb. 2, 2017

(65) Prior Publication Data
US 2018/0213468 A1    Jul. 26, 2018

Related U.S. Application Data

(60) Provisional application No. 62/197,353, filed on Jul. 27, 2015.

(51) Int. Cl.
*H04W 48/10* (2009.01)
*H04L 5/00* (2006.01)
(Continued)

(52) U.S. Cl.
CPC ........... *H04W 48/10* (2013.01); *H04L 5/0053* (2013.01); *H04W 4/70* (2018.02); *H04W 84/042* (2013.01)

(58) Field of Classification Search
CPC ..... H04W 48/10; H04W 4/70; H04W 84/042; H04L 5/0053
See application file for complete search history.

(56) References Cited

U.S. PATENT DOCUMENTS

| 9,125,173 B2 | 9/2015 | Wang et al. |
| 2013/0058279 A1* | 3/2013 | Kakishima ............ H04L 5/0057 370/328 |

(Continued)

FOREIGN PATENT DOCUMENTS

| CA | 2913486 | 12/2014 |
| CN | 103179676 A | 6/2013 |

(Continued)

OTHER PUBLICATIONS

International Search Report and Written Opinion for PCT Application No. PCT/US2016/025750, dated Oct. 7, 2016.
(Continued)

*Primary Examiner* — Gregory B Sefcheck
*Assistant Examiner* — Joshua Smith
(74) *Attorney, Agent, or Firm* — Sterne, Kessler, Goldstein & Fox P.L.L.C.

(57) ABSTRACT

Described is an Evolved Node-B (eNB) comprising one or more processors to generate a first transmission for a first Cellular Internet-of-Things (CIoT) device and a second transmission for a second CIoT device. The first transmission may be generated for a first Narrowband (NB) channel, and the second transmission may be generated for a second NB channel. The first and second transmissions may include the same set of system information. Also described is a CIoT device comprising one or more processors to process a System Information (SI) transmission on one of a plurality of NB channels, and to process and extract information from a PSS and/or SSS transmission on a set of subcarriers corresponding to a set of frequency bands. The plurality of (Continued)

NB channels are within a wireless communication system bandwidth, and at least two of the plurality of NB channels correspond to portions of the wireless communication system bandwidth outside the set of frequency bands.

22 Claims, 11 Drawing Sheets

(51) Int. Cl.
*H04W 4/70* (2018.01)
*H04W 84/04* (2009.01)

(56) References Cited

U.S. PATENT DOCUMENTS

| | | | |
|---|---|---|---|
| 2013/0114587 A1 | 5/2013 | Khoryaev et al. | |
| 2013/0121249 A1* | 5/2013 | Ji | H04W 4/06 370/328 |
| 2013/0190027 A1* | 7/2013 | Cao | H04W 52/0206 455/509 |
| 2013/0194997 A1* | 8/2013 | Zhu | H04W 72/042 370/312 |
| 2013/0272215 A1* | 10/2013 | Khoryaev | H04W 4/06 370/329 |
| 2013/0301552 A1* | 11/2013 | Xu | H04W 72/042 370/329 |
| 2013/0322363 A1* | 12/2013 | Chen | H04L 5/001 370/329 |
| 2014/0029568 A1* | 1/2014 | Wang | H04L 5/0039 370/330 |
| 2014/0119315 A1 | 5/2014 | Darwood et al. | |
| 2014/0247781 A1* | 9/2014 | Somasundaram | H04W 4/70 370/329 |
| 2015/0009894 A1* | 1/2015 | Vermani | H04L 1/0072 370/328 |
| 2015/0201402 A1* | 7/2015 | Morioka | H04W 72/0446 370/329 |
| 2015/0256403 A1* | 9/2015 | Li | H04L 27/2602 370/235 |
| 2015/0296518 A1* | 10/2015 | Yi | H04L 1/08 370/336 |
| 2015/0305005 A1* | 10/2015 | Webb | H04L 5/0048 370/336 |
| 2015/0373690 A1 | 12/2015 | Webb et al. | |
| 2016/0014763 A1* | 1/2016 | Jauh | H04B 7/0452 370/329 |
| 2016/0014811 A1* | 1/2016 | Jauh | H04L 5/0007 370/312 |
| 2016/0105891 A1* | 4/2016 | Li | H04W 4/70 370/329 |
| 2016/0112898 A1* | 4/2016 | Chen | H04W 28/0215 370/235 |
| 2016/0192332 A1* | 6/2016 | Koorapaty | H04W 48/12 370/329 |
| 2016/0295374 A1* | 10/2016 | Persson | H04W 64/00 |
| 2016/0316442 A1* | 10/2016 | Seo | H04L 5/0053 |
| 2016/0338032 A1* | 11/2016 | Wang | H04W 4/70 |
| 2017/0006525 A1* | 1/2017 | Ruiz Delgado | H04W 48/12 |
| 2017/0164250 A1* | 6/2017 | Kim | H04W 4/70 |
| 2017/0164364 A1* | 6/2017 | Song | H04W 4/70 |
| 2017/0202025 A1* | 7/2017 | Ouchi | H04W 16/32 |
| 2017/0353272 A1* | 12/2017 | Takeda | H04L 1/1864 |

FOREIGN PATENT DOCUMENTS

| | | |
|---|---|---|
| CN | 103428748 | 12/2013 |
| CN | 103647822 A | 3/2014 |
| GB | 2516132 A | 1/2015 |
| JP | 2014-522618 A | 9/2014 |
| JP | 2015-503264 A | 1/2015 |
| JP | 2016-508683 A | 3/2016 |
| WO | WO 2013/067386 A1 | 5/2013 |
| WO | WO 2014/114917 A1 | 7/2014 |

OTHER PUBLICATIONS

3GPP,"3rd Generation Partnership Project; Technical Specification Group Radio Access Network; Evolved Universal Terrestrial Radio Access (E-UTRA); Multiplexing and channel coding (Release 8)", 3GPP TS 36.212; v8.0.0; Sep. 2007.

3Gpp, "3rd Generation Partnership Project; Technical Specification Group Radio Access Network; Evolved Universal Terrestrial Radio Access (E-UTRA); Physical channels and modulation (Release 13)", 3GPP TS 36.211; v13.2.0; Jun. 2016.

3Gpp, "3rd Generation Partnership Project; Technical Specification Group Radio Access Network; Evolved Universal Terrestrial Radio Access (E-UTRA); Physical layer procedures (Release 8)", 3GPP TS 36.213; v8.2.0; Mar. 2008.

International Preliminary Report on Patentability for International Patent Application No. PCT/US16/25750, dated Feb. 8, 2018.

Office Action directed to related Japanese Patent Application No. 2017-554827, dated Jan. 28, 2020, with attached English-language translation; 9 pages.

"On PDSCH narrowband location options," R1-152450, 3GPP TSG-RAN WG1 Meeting #81, Agenda Item 62.1.3, Fukuoka, Japan, May 25-29, 2015 (accessible at http://www.3gpp.org/ftp/tsg_ran/WG1_RL1/TSGR1_81/Docs/R1-152450.zip).

"Narrowband LTE—Concept Description," R1-154659, 3GPP TSG-RAN WG1 Meeting #82, Agenda Item 7.2.9, Beijing China, Aug. 24-28, 2015 (accessible at http://www.3gpp.org/ftp/tsg_ran/WG1_RL1/TSGR1_82/Docs/R1-154659.zip).

"Views on specification for a Cellular IoT system in RAN," R1-150709, 3GPP TSG-RAN Meeting #68, Agenda Item 13.1.1, Malmo, Sweden, Jun. 15-18, 2015 (accessible at http://www.3gpp.org/ftp/tsg_ran/TSG_RAN/TSGR_68/Docs/RP-150709.zip).

Office Action directed to related Chinese Patent Application No. 201680043585.2, dated Jul. 24, 2020, with attached English-language translation; 18 pages.

\* cited by examiner

SYSTEM AND METHODS FOR SYSTEM OPERATION FOR NARROWBAND-LTE FOR CELLULAR IOT

CLAIM OF PRIORITY

This Application is a National Stage Entry of, and claims priority to, PCT Application Serial Number PCT/US16/25750, filed on Apr. 1, 2016 and entitled "System And Methods for System Operation For Narrowband-LTE For Cellular IOT", which claims priority under 35 U.S.C. § 119(e) to U.S. Provisional Patent Application Ser. No. 62/197,353 filed Jul. 27, 2015 and entitled "System And Methods For System Operation For Narrowband-LTE For Cellular IoT," both of which are herein incorporated by reference in their entireties.

BACKGROUND

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced (LTE-A) system, and a 5th Generation wireless/5th Generation mobile networks (5G) system. Next-generation wireless cellular communication systems may provide support for massive numbers of user devices like Narrowband Internet-of-Things (NB-IoT) devices, Cellular Internet-of-Things (CIoT) devices, or Machine-Type Communication (MTC) devices. Such devices may have very low device complexity, may be latency-tolerant, and may be designed for low throughput and very low power consumption.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
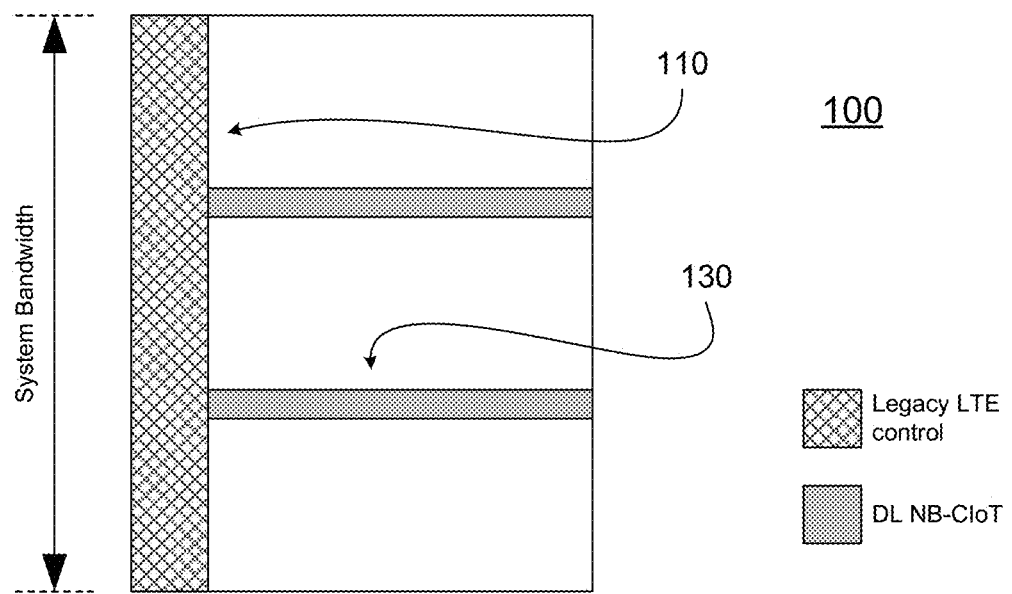
FIG. 1 illustrates a downlink (DL) legacy 3rd Generation Partnership Project (3GPP) Long-Term Evolution (LTE) system bandwidth (BW), in accordance with some embodiments.

A system supporting user devices like Narrowband Internet-of-Things (NB-IoT) devices or Cellular Internet-of-Things (CIoT) devices may be based on modifications to features in Release 13 of the Long-Term Evolution (LTE) Advanced (LTE-A) specifications (frozen on $30^{th}$ Sep., 2012). Relevant features that may be modified include support for Category M devices, which may be low-complexity MTC devices. Category M devices may be designed for bandwidths of approximately 1.4 MHz on the Downlink (DL) and the Uplink (UL), at both Radio Frequency (RF) and baseband (BB), regardless of the system bandwidth.

In various embodiments, NB-IoT systems may support NB-IoT devices for up to 200 kHz of bandwidth, for both the DL and the UL, or for the UL at both RF and BB. An NB-IoT system in accordance with these parameters and having 180 kHz or 200 kHz of bandwidth may be deployed on Global Systems for Mobile Communications (GSM) bands, or on LTE guard bands, or within a larger LTE system bandwidth where the NB-IoT system may occupy one LTE Physical Resource Block (PRB). An NB-IoT may use a mechanism based upon Orthogonal Frequency-Division Multiple Access (OFDMA) in the DL, and may use a mechanism based upon either Single-Carrier Frequency-Division Multiple Access (SC-FDMA) or Discrete-Fourier-Transform-Spread OFDM (DFT-S-OFDMA) in the UL.

As an alternative, an NB system for CIoT devices may be designed as a new Radio Access Technology (RAT) following a Clean Slate approach. Such an approach may support CIoT devices on 200 kHz-wide GSM bands, or on LTE guard bands.

Details for NB-IoT systems are discussed below. In particular, the discussion below addresses functionality of NB-IoT systems operating on NBs within a larger LTE wireless cellular communications system, a network's handling of multiple NBs, and various options for mapping DL scheduling and UL scheduling to time-frequency resources.

For purposes of this disclosure, the terms NB-IoT, NB-IoT system, NB-CIoT system, CIoT system, and NB-LTE system may be interchangeable, and may refer to substantially similar concepts. Moreover, for purposes of this disclosure, the terms NB-IoT device, User Equipment (UE), NB-IoT UE, NB-CIoT device, CIoT device, NB-LTE device, Machine-Type Communication (MTC) device, UE device, and mobile equipment may be interchangeable, and may refer to substantially similar concepts. The terms NB-IoT, Evolved Node-B (eNB), and base station may also be interchangeable, and may refer to substantially similar concepts. For example, a UE may be a CIoT device, and an eNB may be an NB-IoT (e.g. an NB-IoT system).

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Definition of Narrowbands and Associated NB-IoT Operation

An NB-IoT (e.g., an NB-IOT system) may be deployed within a legacy or existing LTE system bandwidth (BW) by assigning a single Physical Resource Block (PRB) in frequency to the NB-IoT. Alternatively, an NB-IoT may be deployed as a dedicated system in an LTE guard band, or in a portion of re-farmed GSM spectrum.

Subcarrier spacing may be maintained at 15 kHz for the DL and may be changed to a smaller spacing such as 3.75 kHz or 2.5 kHz for the UL. Subcarrier spacing may alternatively be maintained at 15 kHz for both the DL and the UL. Furthermore, a combination of different subcarrier spacing values may also be supported. For example, both 15 kHz and 3.75 kHz subcarrier spacing for the UL may be supported. With respect to waveforms and access mechanisms, an NB-IoT may reuse LTE OFDMA design for the DL and LTE SC-FDMA design for the UL.

In order to provide for a seamless coexistence between legacy LTE systems and NB-IoTs deployed within legacy LTE systems, an NB-IoT may be defined to operate in resource region in the DL outside of a legacy LTE wideband control region, e.g., an LTE Physical Downlink Control Channel (PDCCH) region. FIG. 1 illustrates a downlink (DL) legacy LTE system BW, in accordance with some embodiments. Legacy LTE system BW 100 may comprise a legacy LTE control region 110 and one or more DL NB-IoT regions 130. DL NB-IoT regions 130, which may support DL transmissions for NB-IoTs, may be defined outside of legacy LTE control region 110, and may accordingly span less than a full subframe.

Figure 2:
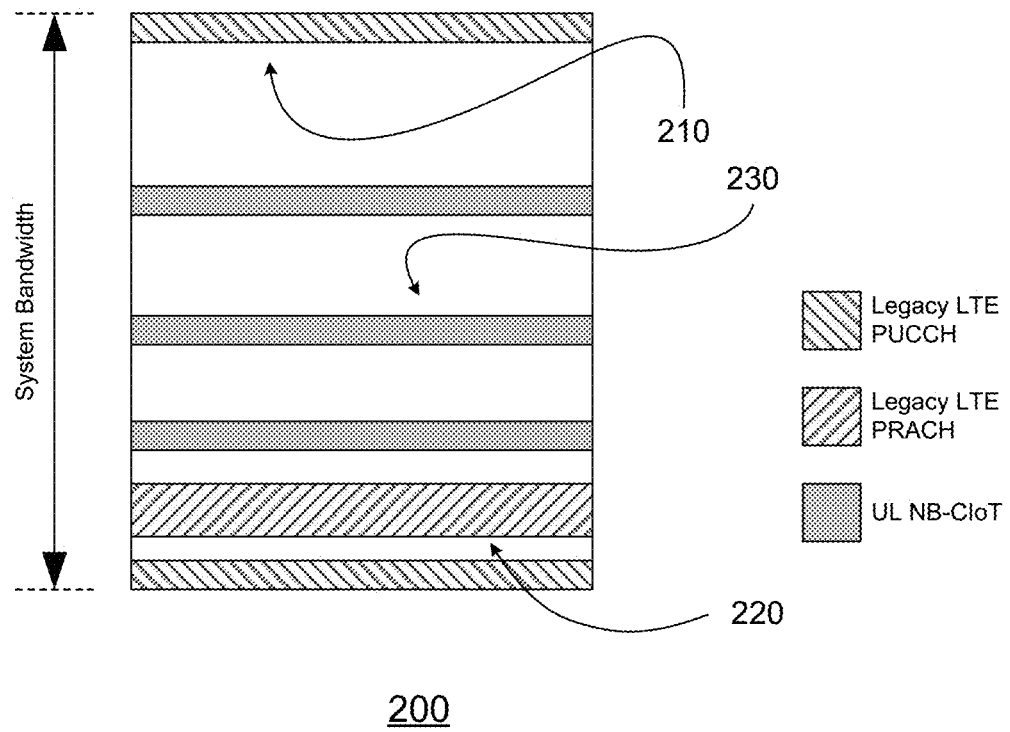
FIG. 2 illustrates an uplink (UL) legacy LTE system, in accordance with some embodiments.

Similarly, FIG. 2 illustrates an uplink (UL) legacy LTE system BW, in accordance with some embodiments. Legacy LTE system BW 200 may comprise one or more legacy LTE Physical Uplink Control Channel (PUCCH) regions 210, one or more legacy LTE Physical Random Access Channel (PRACH) regions 220, and one or more UL NB-IoT regions 230. UL NB-IoT regions 230, which may support UL transmissions for NB-IoTs, may be defined outside of legacy LTE PUCCH regions 210 and legacy LTE PRACH regions 220.

As depicted, DL NB-IoT regions 130 do not overlap legacy LTE control region 110 (e.g., the OFDM symbols on the DL that may be used to transmit PDCCH). Similarly, UL NB-IoT regions 230 might not overlap legacy LTE PUCCH regions 210 and legacy LTE PRACH regions 220. However, in contrast with the DL, in the case of the UL, the avoidance of LTE PUCCH and LTE PRACH regions may be left up to an eNB's implementation, and may depend upon an eNB's capabilities. NB-IoTs operating within DL NB-IoT regions 130 and/or UL NB-IoT regions 230 may accordingly coexist more easily with legacy LTE systems.

Any particular CIoT device (or other UE operable within an NB-IoT) might merely support one NB, such as a bandwidth of 200 kHz at both Radio Frequency (RF) and baseband (BB). However, at the system level, multiple NB-IoT regions or NB-IoT carriers may be deployed across multiple NBs within an LTE system BW in order to support a massive number of CIoT devices. In addition, multiple NB-IoTs may be used to realize the benefits of frequency diversity by supporting Frequency Hopping (FH), in which a sequence of transmissions associated with a particular UE may hop from one NB to another NB, as will be discussed further below.

The UE may receive a DL physical channel, or may transmit a Narrowband Physical Uplink Shared Channel (NB-PUSCH) on the UL with a possible re-tuning of the carrier frequency at the device receiver chain. Additionally, the number of DL NB-IoT regions and UL NB-IoT regions may be different, which may advantageously assist in adjusting DL/UL traffic depending on MTC deployment scenario and specific application.

Primary Synchronization Signal (PSS), Secondary Synchronization Signal (SSS), and PBCH may be transmitted within six central PRBs of a legacy LTE system BW. In order to minimize impact between legacy LTE UEs and NB-IoT devices, in various embodiments, the NBs for NB-IoT carriers within an LTE system may be located on PRBs outside of the six central PRBs for LTE system BWs greater than 1.4 MHz. In some embodiments, the NB-IoT carriers for such NB-IoTs may be located outside of the seventy-two central subcarriers of an LTE system, or outside of various PRBs coinciding with the central subcarriers of an LTE system (which may be a central six PRBs or a central seven PRBs).

In some embodiments in which multiple NBs may be available to an NB-IoT system from the eNB perspective, one of the available DL NBs may be used to transmit at least an NB Synchronization Channel (NB-SCH). An NB carrying an NB-SCH may be designated as a Primary NB, or may alternatively be designated as an Anchor NB. A CIoT device may acquire time-frequency synchronization and an NB-MIB from transmissions on the Primary NB.

A Primary NB may also be used to additionally transmit at least an NB Physical Broadcast Channel (NB-PBCH) carrying an NB Master Information Block (NB-MIB). An NB-MIB may include (without being limited to):
- a number of DL NBs available and their locations within a bandwidth (e.g. their locations within a maximum LTE bandwidth configuration defined, e.g., 110 PRBs corresponding to a maximum LTE bandwidth of 20 MHz);
- a number of locations of available additional DL NBs expressed as offsets relative to a location of a Primary NB (if a single Primary NB is defined);
- an at least partial indication of an NB System Frame Number (NB-SFN) (for example, a number of bits identifying an NB-SFN, such as 4 bits);
- implicit or explicit information regarding a number of antennas used for DL transmissions by an Evolved Node-B (eNB);
- at least partial scheduling and resource allocation information for the transmission of basic NB System Information (SI), similar to a legacy LTE SIB1. Such information may include:
  - an NB index or offset with respect to a Primary NB (if the Narrowband System Information Blocks (NB-SIBs) are not also transmitted within the Primary NB);
  - a time offset and/or periodicity for an NB System Information Block Type 1 (NB-SIB1) transmission; and
  - a Modulation and Coding Scheme (MCS) and/or Transport Block Size (TBS) used for transmission of the NB-SIB1 (alternatively, some of the scheduling and resource allocation information may be fixed by specification); and
- an indication as to whether an NB-IoT is deployed stand-alone or in coexistence with a legacy LTE system (for example, an NB-IoT deployment bit having a value of "1" may indicate an NB-IoT deployed in coexistence with a legacy LTE system, in which case a DL NB-IoT region may be defined outside of a legacy LTE wideband control region as shown for example in FIG. 1, whereas an NB-IoT deployment bit having a value of "0" may indicate an NB-IoT deployed in a stand-alone manner, in which case a DL NB-IoT region may span one full subframe). In this context, NB-IoT carriers deployed in a "stand-alone" manner may include NB-IoT carriers that are not deployed within an LTE system bandwidth—for example, as described above, such NB-IoT carriers may be deployed on re-farmed and/or re-purposed GSM carriers, or within LTE guard bands.

With respect to the indication of the number of DL NBs available and their locations within a bandwidth, for NB-IoTs deployed within an LTE system BW, an NB-MIB may provide an indication of the DL LTE system BW itself. The NB-MIB may also provide a location of a Primary NB, which may be expressed as an offset relative to a portion of the LTE system BW (e.g., an offset relative to a lowest frequency of the LTE system BW). Information for other DL NB-IoTs may then be indicated with respect to a location of the Primary NB within the LTE system BW. Alternatively, information for other DL NB-IoTs may be indicated with respect to an indexing of PRBs within the LTE system BW (such as for embodiments having multiple Primary NBs).

With respect to the indication of an NB-SFN, as mentioned above, some embodiments may use a smaller subcarrier spacing for the UL, such as 3.75 or 2.5 kHz. In cases where a smaller subcarrier spacing is used, in order to maintain an aligned timing relationship between DL scheduling time-granularity and UL scheduling time-granularity, the resource allocation and frame structure for the DL may be based on NB "subframe (SF) groups" (NB-SFs). An NB-SF may contain both an integer number of DL subframes (e.g., LTE subframes) and an integer number of UL subframes (e.g., NB subframes). An NB radio frame may then comprise ten NB-SFs.

For example, with 15 kHz subcarrier spacing for the DL and 3.75 subcarrier spacing for the UL, an NB-SF may contain four LTE DL subframes (and one UL subframe). The NB-SF may have a cumulative duration of 4 ms, and an NB radio frame based on the 4 ms NB-SF may in turn have a cumulative duration of 40 ms. As another example, with 15 kHz subcarrier spacing for the DL and 2.5 kHz subcarrier spacing for the UL, an NB-SF may contain six LTE DL subframes (and one UL subframe). The NB-SF and may have a cumulative duration of 6 ms, and an NB radio frame based on a 6 ms NB-SF may in turn have a cumulative duration of 60 ms.

A CIoT device may sometimes re-tune to a Primary NB in order to re-acquire synchronization or NB-MIB information. For example, a CIoT device may re-tune to a Primary NB after waking up from deep sleep. The Primary NB may be common for all cells in the network, and a UE may re-tune to the Primary NB for the purpose of Radio Resource Management (RRM) functionalities for neighbor cells.

In other embodiments in which multiple NBs may be available for NB-IoTs at the system-level, instead of NB-SCH and/or NB-PBCH being transmitted on a single DL NB, NB-SCH and/or NB-PBCH may be transmitted on multiple DL NBs (up to and including all of the available DL NBs). Although this technique may increase system overhead, it may advantageously minimize both UE complexity and the need to monitor a Primary NB for NB-SCH and/or NB-PBCH.

In such embodiments, an indexing of DL NBs may be performed in an absolute manner instead of with respect to a Primary NB. In addition, the various time-locations for NB-SCH and NB-PBCH across the DL NBs may follow an interleaved pattern, which may be a function of the number of available NBs. This may advantageously facilitate fast acquisition and/or re-acquisition of synchronization and SI.

In various embodiments, the location of an NB with NB-SCH and NB-PBCH transmissions may be aligned with a defined channel raster. For example, possible locations of a Primary NB may be locations aligned with a 100 kHz channel raster currently defined for LTE. Being aligned with a channel raster may include being aligned to a raster boundary within a defined or otherwise predetermined offset range (such as at an offset of +/−2.5 kHz for even LTE system bandwidths, or at an offset of +/−7.5 kHz for odd LTE system bandwidths). Aligning locations of NBs in this manner may advantageously facilitate location of the NBs with NB-SCH and NB-PBCH transmissions (such as a Primary NB), since a CIoT device may scan through a defined channel raster in order to acquire NB-SCH and NB-PBCH transmissions. A CIoT device for an NB-IoT deployed in an LTE guard-band may scan through a defined channel raster in a similar manner.

Options for Scheduling of DL and UL Transmissions

DL and UL scheduling performed per NB-SF may advantageously maintain an aligned timing relationship between DL and UL transmissions, or may follow independent minimum scheduling durations for DL and UL. For example, as discussed above, an NB-SF may have a cumulative duration of 4 ms or multiples thereof corresponding with a 3.75 kHz subcarrier spacing in the UL, or a cumulative duration of 6 ms or multiples thereof corresponding with a 2.5 kHz subcarrier spacing in the UL, while for DL, NB-SF may span substantially the same duration as a legacy LTE subframe (e.g., 1 ms).

In the time domain, DL scheduling may support both cross-NB-SF scheduling and same-NB-SF scheduling based on NB Physical Downlink Control Channel (NB-PDCCH) transmissions. (NB-PDCCH transmissions may in turn be based upon either a legacy LTE PDCCH, or a PDCCH for MTC (M-PDCCH) as defined in Release 13 as part of a Release 13 MTC Work Item.) For cross-NB-SF scheduling, an NB-PDCCH in NB-SF number n may schedule an NB Physical Downlink Shared Channel (NB-PDSCH) in NB-SF number n+k (where k is greater than or equal to 1). In either case, an NB-PDCCH and an NB-PDSCH may be Time Division Multiplexed (TDM) within the same NB-SF such that the NB-PDCCH may occupy a contiguous or non-contiguous x ms in time, and NB-PDSCH may occupy Y-x ms in time (where the length of the NB-SF is Y ms, and where x is less than or equal to Y).

For example, x ms may correspond to x LTE Sub-frames (SFs). The value of x may be fixed by specification, or may be indicated dynamically using an NB Physical Control Format Indicator Channel (NB-PCFICH). In some embodiments, an M-PDCCH in accordance with Release 13 (based in turn on an EPDCCH design of Release 11, frozen on 22 Jan. 2010), which may occupy from one to six PRBs within a single LTE SF, may be spread in the time dimension to occupy from 1 ms to 6 ms and a single PRB.

For UL scheduling, assuming Frequency Division Duplex (FDD) based operation, an NB-PDCCH in NB-SF number n may schedule an NB-PUSCH in NB-SF number n+j (where j is greater than or equal to two). This may advantageously accommodate both a UL Timing Advance (TA) and an additional DL-to-UL switching time for CIoT devices that may merely support Half Duplex FDD (HD-FDD).

For both DL and UL, a Hybrid Automatic Repeat Request (HARQ) timing may be defined at an NB-SF granularity. For example, a HARQ-ACK feedback corresponding to the most recent repetition of an NB-PDSCH received in NB-SF number m (i.e., wherein NB-SF number m is the last subframe of the latest-scheduled NB-PDSCH transport block) may be transmitted on the UL in NB-SF number m+kHARQ (where kHARQ may be from 2 to 4).

Figure 3:
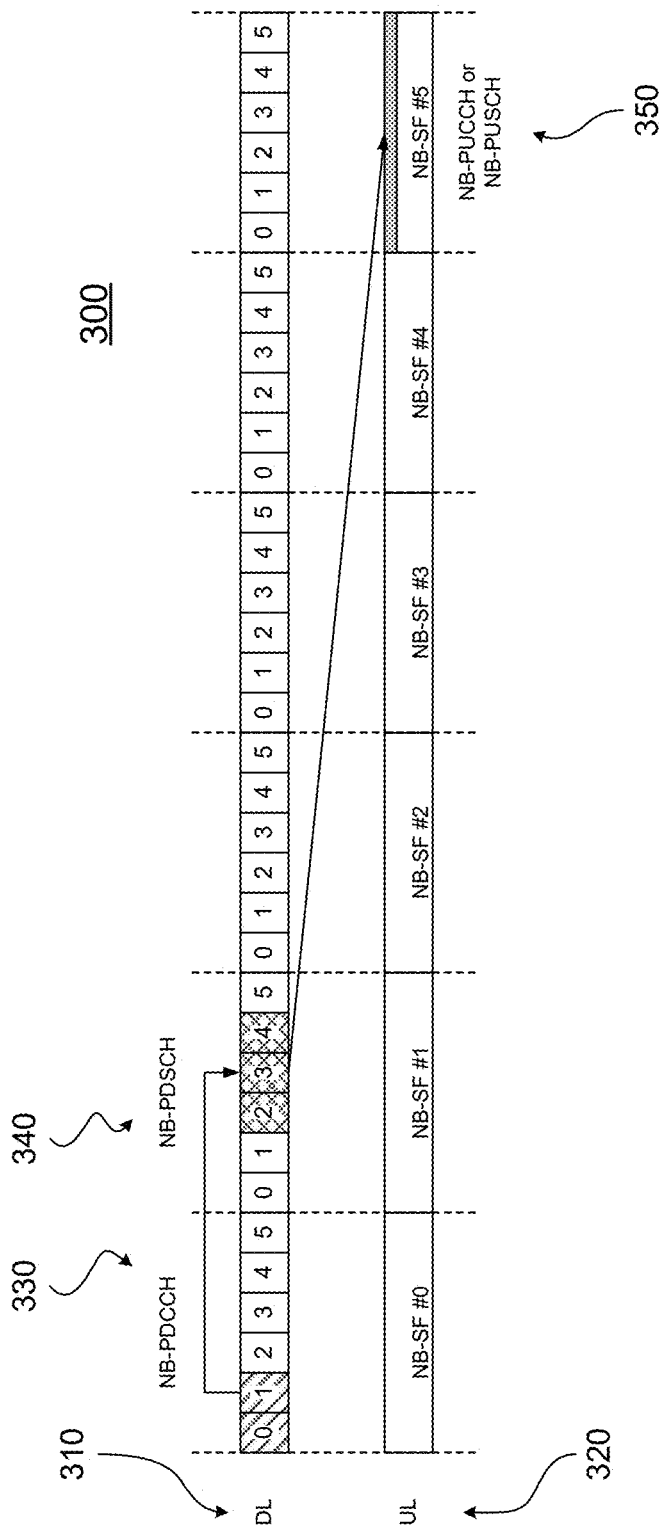
FIG. 3 illustrates an example of DL Hybrid Automatic Repeat Request (HARQ) timing for a Narrowband (NB) Internet-of-Things (NB-IoT) system, in accordance with some embodiments.

FIG. 3 illustrates an example of DL Hybrid Automatic Repeat Request (HARQ) timing for an NB-IoT, in accordance with some embodiments. An NB-IoT transmission sequence 300 may comprise an DL subframe sequence 310 and a UL NB-SF sequence 320. As depicted, six LTE DL subframes may correspond to one NB-IoT NB-SF, as discussed above with respect to a smaller 2.5 kHz subcarrier spacing in the UL. NB-IoT transmission sequence 300 may comprise six NB-SFs, numbered 0 through 5.

In an example of cross-NB-SF scheduling, an NB-PDCCH 330 may schedule an NB-PDSCH 340 for transmission one NB-SF after NB-PDCCH 330. A corresponding NB-PUCCH or NB-PUSCH 350 may subsequently carry ACK/NACK information for NB-PDSCH 340. A gap between NB-PDSCH 340 and the corresponding HARQ ACK/NACK feedback may be 4 NB-SF (implying a kHARQ of 4, which is from 2 to 4 as discussed above).

Figure 4:
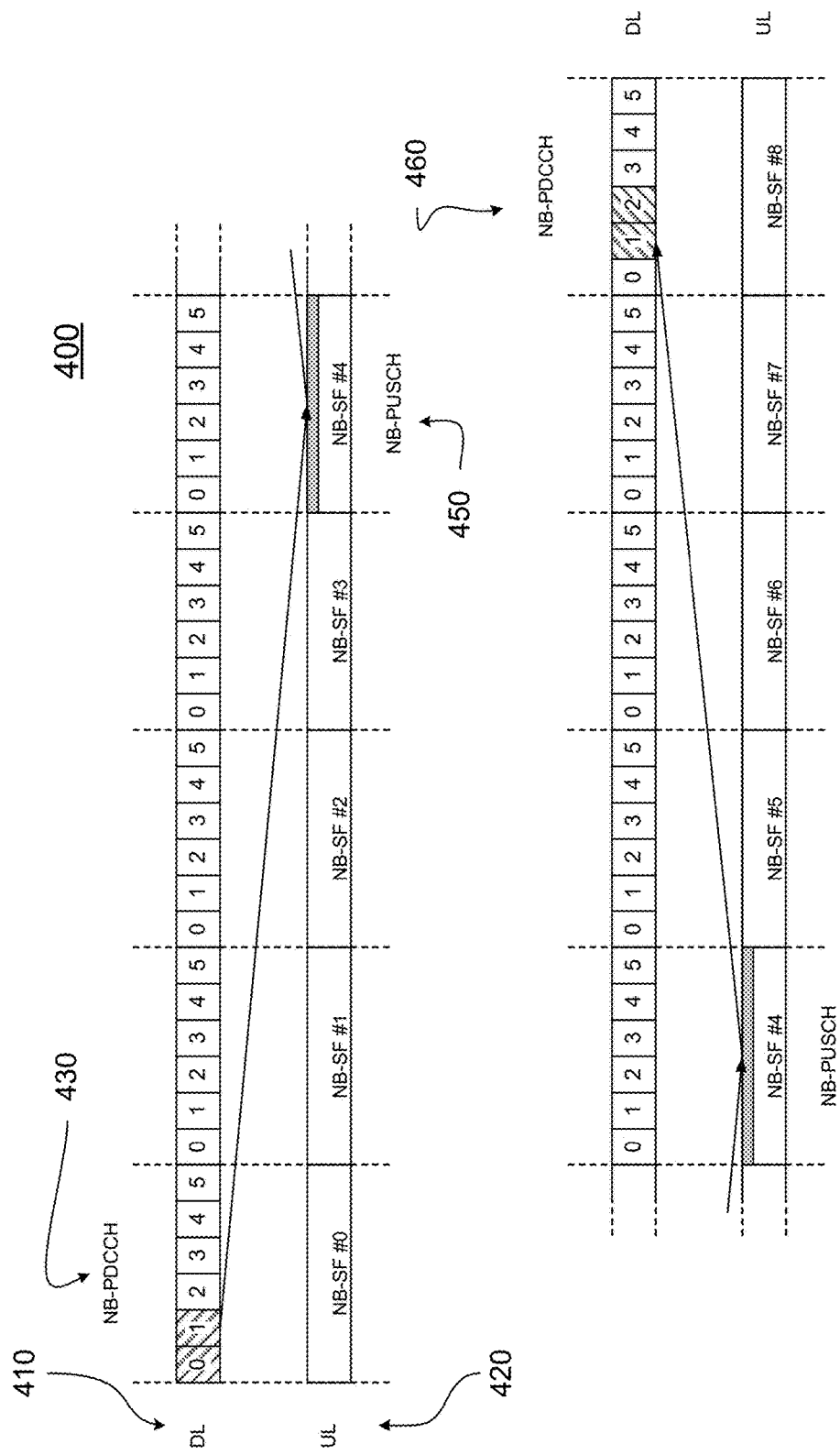
FIG. 4 illustrates an example of UL HARQ timing for an NB-IoT system, in accordance with some embodiments.

FIG. 4 illustrates an example of UL HARQ timing for an NB-IoT, in accordance with some embodiments. An NB-IoT transmission sequence 400 comprises an DL subframe sequence 410 and a UL NB-SF sequence 420. Again, six DL subframes correspond to one UL NB-SF. NB-IoT transmission sequence 400 is depicted in the figure as beginning in a top row and continuing in a bottom row, and comprises nine NB-SFs numbered 0 through 8.

In this example, an NB-PDCCH 430 may be transmitted in NB-SF number 0, and a corresponding NB-PUSCH 450 may be transmitted in NB-SF number 4, leaving a gap of 4 NB-SFs between the two (implying a j of 4, which is greater than 2 as discussed above). Furthermore, an NB-PDCCH 460 may subsequently carry ACK/NACK information for NB-PUSCH 450. A gap between NB-PUSCH 450 and the corresponding ACK/NACK feedback may be at least 4 DL NB-SFs (implying a kHARQ of 4, which is from 2 to 4 as discussed above). Although NB-PDCCH 460 may carry ACK/NACK information in this example, other mechanisms may be employed in various embodiments, such as using an NB Physical HARQ Indicator Channel (NB-PHICH) to carry UL ACK/NACK information.

Multi-NB-SF scheduling, in which a single NB Downlink Control Information (NB-DCI) may indicate DL assignment or UL grant for multiple NB-SFs, may also be supported to minimize control overhead. A maximum TBS value for both DL unicast and UL unicast, or merely for DL broadcast, may be set to some number of bits, such as 1000 bits. Multiple NB-SFs scheduled as part of a multi-NB-SF assignment may be used either for repetition of a single TB, or for reception and/or transmission of different TBs as indicated in the NB-DCI.

In one example, the NB-DCI may explicitly indicate a number of TBs to be received and/or transmitted, respectively, for a DL assignment or a UL grant. As another example, a one-bit field in the NB-DCI may indicate whether the same TB or different TBs should be transmitted over the allocated NB-SFs.

Frequency Hopping and Frequency-Selective Scheduling

In the frequency domain, NB-PDSCH and NB-PUSCH resources for NB-IoT deployments within a single 200 kHz NB may be confined to the same 200 kHz NB. NB-IoT deployments with multiple NBs, however, may support techniques such as Frequency Hopping (FH) and frequency-selective scheduling for NB-PDSCH and NB-PUSCH.

Under FH, a UE device or CIoT device may receive or transmit on a certain NB for one or more NB-SFs before re-tuning to a different established NB in accordance with an FH pattern. The configuration of the FH pattern may be indicated as part of SI and may be cell-specific. NB allocation through FH may advantageously provide the benefits of frequency diversity (especially in the event of repeated transmissions for coverage enhancement), and may advantageously enable a network to more evenly distribute a system loading across available NBs.

In some embodiments, an FH pattern may include information regarding NB locations and hopping patterns with respect to an NB-SFN. For example, an FH pattern may include a number of NB-SFs that a UE device or CIoT device may monitor and/or transmit on, and a relative location of a next NB due to FH. The FH pattern may be specified as a function of a total number of NBs available and may be indicated as part of SI. Subsequently, the exact pattern of NBs to which a UE may hop may be determined based upon the location of a particular NB with respect to a reference NB, and/or upon the current NB-SFN with respect to a reference NB-SFN (e.g. NB-SFN number 0).

Figure 5:
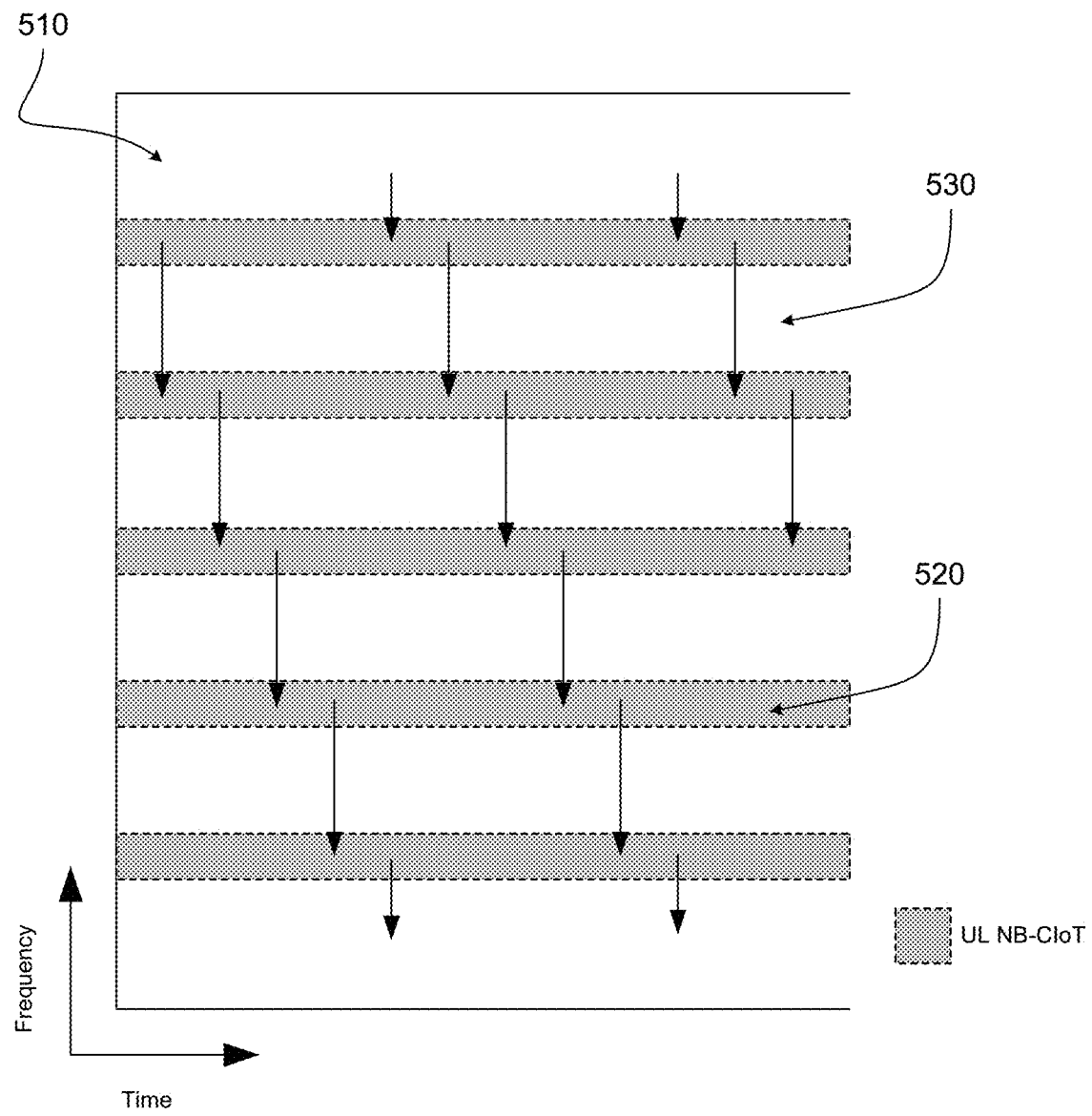
FIG. 5 illustrates a frequency hopping pattern over multiple narrowbands within an LTE system BW, in accordance with some embodiments.

FIG. 5 illustrates a frequency hopping pattern over multiple narrowbands within an LTE system bandwidth, in accordance with some embodiments. For an FH pattern 500, an LTE system bandwidth 510 may encompass a plurality of NBs 520. A UE device or CIoT device may then follow a plurality of next-NB indicators 530 to hop from one NB frequency band to another NB frequency band over time.

In some embodiments, different UE devices or CIoT devices, or sets of such devices, may be grouped to monitor DL NB-SFs on different NBs, wherein a device-to-FH-pattern mapping may be specified as a function of a device identity similar to a Radio Network Temporary Identifier (RNTI). For some embodiments, an FH pattern may be defined as a function of one or more of a physical cell ID, a subframe or NB-SF index, and/or a device ID. In various embodiments, an FH pattern may be defined as a function of one or more of a physical cell ID (PCID), a subframe or NB-SF index, and/or a device ID.

Under frequency-selective scheduling, an NB-PDCCH in one NB may indicate an NB-PDSCH assignment in a different NB. Moreover, NB-IoT deployments that support frequency-selective scheduling may benefit from supporting cross-NB-SF scheduling with sufficient time for CIoT devices to decode an NB-PDCCH and re-tune to a different NB.

For example, an NB-PDCCH in NB-SF number n may schedule an NB-PDSCH in NB-SF number n+k (where k is greater than or equal to 2). As another example, if NB-PDCCH extends over at least 2 ms in the time domain, a value of k equal to 1 may be sufficient for a CIoT device to receive the scheduled NB-PDSCH.

In order to avoid propagation of errors due to failed NB-DCI decoding, CIoT devices supporting frequency-selective scheduling may be assigned to monitor a default NB for receiving NB-PDCCH. A CIoT device may then monitor the default NB for NB-PDCCH, and may re-tune to a different NB for receiving a frequency-selectively-scheduled NB-PDSCH.

A default NB for monitoring NB-PDCCH may be configured in a cell-specific manner or in a UE-specific manner. The location of a default NB for NB-PDCCH may be defined logically with a cell-specific NB hopping pattern, which may be defined as a function of a PCID and/or a number of NBs available for DL. The location of a default NB may also be defined as a function of other parameters that may be indicated explicitly or implicitly by an NB-SCH, an NB-MIB, or a Narrowband System Information Block (NB-SIB) (such as an NB-SIB transmitted without dynamic scheduling, e.g., on the Primary NB).

In some embodiments, in addition to the configuration of a default NB for NB-PDCCH monitoring (similar to resource allocation for a common search space for NB-PDCCH), an NB to monitor for NB-PDCCH fort at least unicast scheduling may also be configured in a UE-specific manner via dedicated Radio Resource Control (RRC) signaling scheduled by an NB-PDCCH on a default NB for NB-PDCCH monitoring (e.g., the Primary NB).

In embodiments supporting cross-NB-SF scheduling, for DCI formats containing a DL assignment, an NB index and a subframe index within one NB-SF may be included for NB-PDSCH resource allocation. For DCI formats containing a UL grant, an NB index and subcarrier/subcarrier block index may be included for NB-PUSCH resource allocation.

In order to provide enhanced coverage, NB-PDSCH and/or NB-PUSCH may support transmission repetitions or retransmissions using a Redundancy Version (RV), or cycling over a set of RVs. A number of transmission repetitions or retransmissions may be indicated dynamically using Layer 1 control for unicast message reception or transmission, or by being mapped to a repetition level or a coverage level of the CIoT device, or by a hybrid method, such as by dynamic signaling from among a set of values mapped to each repetition level or coverage level of the CIoT device.

Figure 6:
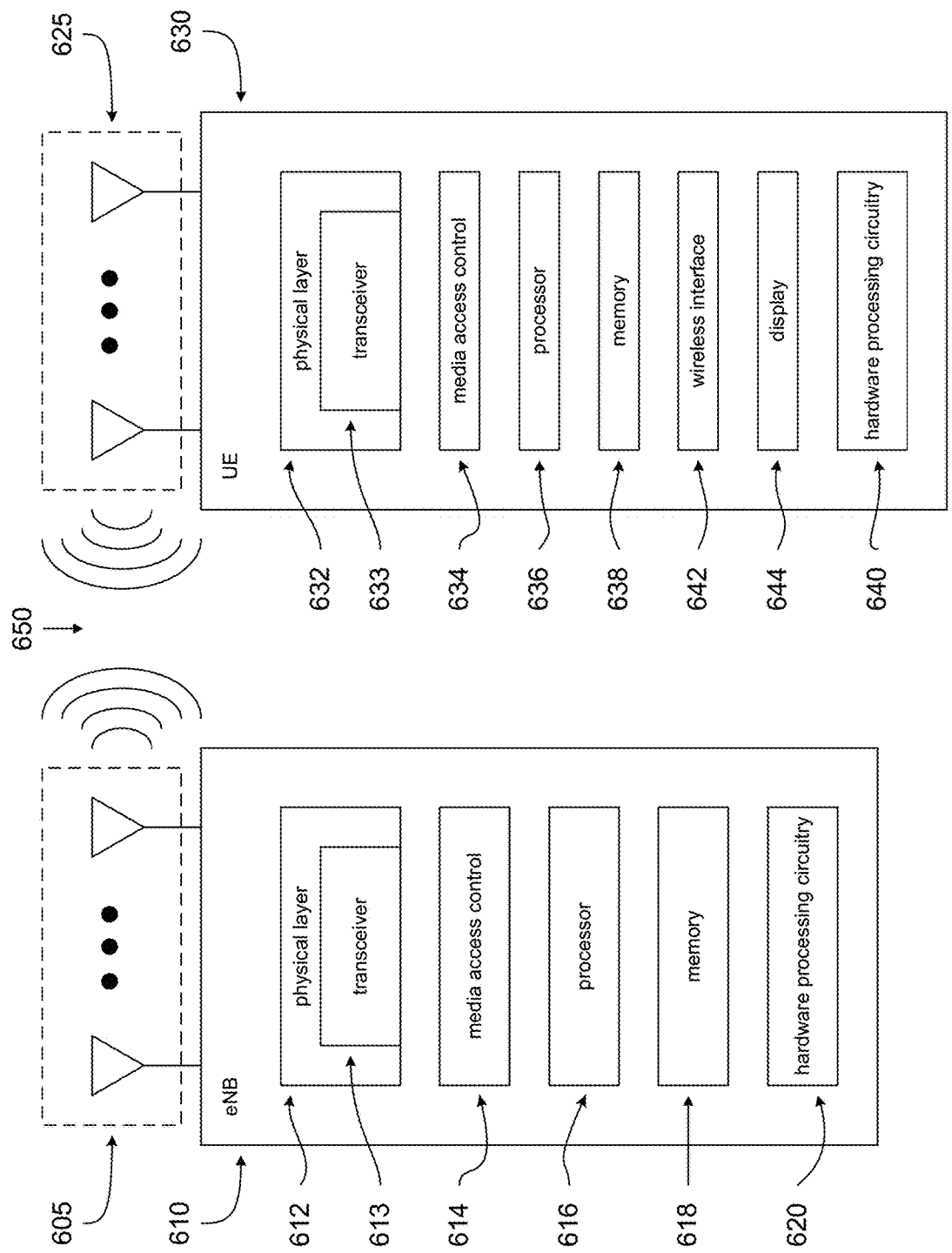
FIG. 6 illustrates an Evolved Node B (eNB) and an NB-IoT device, in accordance with some embodiments.

FIG. 6 illustrates an Evolved Node B (eNB) and an NB-IoT device, in accordance with some embodiments. FIG. 6 includes block diagrams of an eNB 610 and a UE 630 which are operable to co-exist with each other and other elements of an LTE network. High-level, simplified architectures of eNB 610 and UE 630 are described so as not to obscure the embodiments. It should be noted that in some embodiments, eNB 610 may be a stationary non-mobile device.

For purposes of this disclosure, eNB 610 may be an NB-IoT, or another NB-LTE system operable to serve CIoT devices. Similarly, for purposes of this disclosure, UE 630 may be a CIoT device, or another device operable to interoperate with an NB-IoT in an NB-LTE system.

eNB 610 is coupled to one or more antennas 605, and UE 630 is similarly coupled to one or more antennas 625. However, in some embodiments, eNB 610 may incorporate or comprise antennas 605, and UE 630 in various embodiments may incorporate or comprise antennas 625.

In some embodiments, antennas 605 and/or antennas 625 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 605 are separated to take advantage of spatial diversity.

eNB 610 and UE 630 are operable to communicate with each other on a network, such as a wireless network. eNB 610 and UE 630 may be in communication with each other over a wireless communication channel 650, which has both a downlink path from eNB 610 to UE and an uplink path from UE 630 to eNB 610.

As illustrated in FIG. 6, in some embodiments, eNB 610 may include a physical layer circuitry 612, a MAC (media access control) circuitry 614, a processor 616, a memory 618, and a hardware processing circuitry 620. A person skilled in the art will appreciate that other components not shown may be used in addition to the components shown to form a complete eNB.

In some embodiments, physical layer circuitry 612 includes a transceiver 613 for providing signals to and from UE. Transceiver 613 provides signals to and from UEs or other devices using one or more antennas 605. In some embodiments, MAC circuitry 614 controls access to the wireless medium. Memory 618 may be, or may include, a storage media/medium such as a magnetic storage media (e.g. magnetic tapes or magnetic disks), an optical storage media (e.g. optical discs), an electronic storage media (e.g. conventional hard disk drives, solid-state disk drives, or flash-memory-based storage media), or any tangible storage media or non-transitory storage media. Hardware processing circuitry 620 may comprise logic devices or circuitry to perform various operations. In some embodiments, processor 616 and memory 618 are arranged to perform the operations of hardware processing circuitry 620, such as operations described herein with reference to logic devices and circuitry within eNB 610 and/or hardware processing circuitry 620.

As is also illustrated in FIG. 6, in some embodiments, UE 630 may include a physical layer circuitry 632, a MAC circuitry 634, a processor 636, a memory 638, a hardware processing circuitry 640, a wireless interface 642, and a display 644. A person skilled in the art would appreciate that other components not shown may be used in addition to the components shown to form a complete UE.

In some embodiments, physical layer circuitry 632 includes a transceiver 633 for providing signals to and from eNB 610 (as well as other eNBs). Transceiver 633 provides signals to and from eNBs or other devices using one or more antennas 625. In some embodiments, MAC circuitry 634 controls access to the wireless medium. Memory 638 may be, or may include, a storage media/medium such as a magnetic storage media (e.g. magnetic tapes or magnetic disks), an optical storage media (e.g. optical discs), an electronic storage media (e.g. conventional hard disk drives, solid-state disk drives, or flash-memory-based storage media), or any tangible storage media or non-transitory storage media. Wireless interface 642 may be arranged to allow the processor to communicate with another device. Display 644 may provide a visual and/or tactile display for a user to interact with UE 630, such as a touch-screen display. Hardware processing circuitry 640 may comprise logic devices or circuitry to perform various operations. In some embodiments, processor 636 and memory 638 may be arranged to perform the operations of hardware processing circuitry 640, such as operations described herein with reference to logic devices and circuitry within UE 630 and/or hardware processing circuitry 640.

Elements of FIG. 6, and elements of other figures having the same names or reference numbers, can operate or function in the manner described herein with respect to any such figures (although the operation and function of such elements is not limited to such descriptions). For example, FIGS. 7, 8, and 11 also depict embodiments of eNBs, hardware processing circuitry of eNBs, UEs, and/or hardware processing circuitry of UEs, and the embodiments described with respect to FIG. 6 and FIGS. 7, 8, and 11 can operate or function in the manner described herein with respect to any of the figures.

In addition, although eNB 610 and UE 630 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 7:
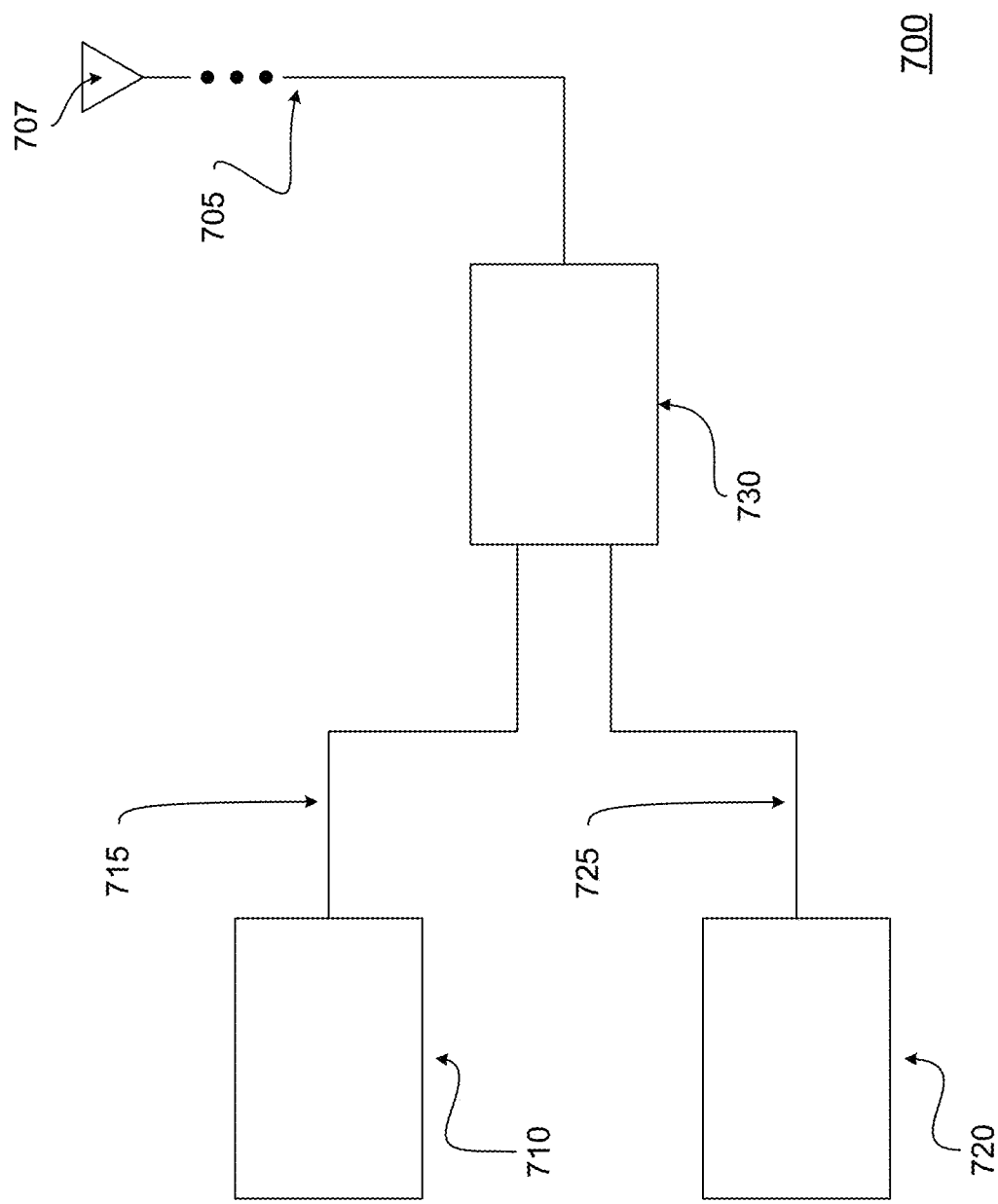
FIG. 7 illustrates hardware processing circuitry for an eNB for NB-IoT operation, in accordance with some embodiments.

FIG. 7 illustrates hardware processing circuitry for an eNB for NB-IoT operation, in accordance with some embodiments. A hardware processing circuitry 700 may comprise logic devices and/or circuitry operable to perform various operations. For example, with reference to FIGS. 6 and 7, eNB 610 (or various elements or components therein, such as hardware processing circuitry 620, or combinations of elements or components therein) may include part of, or all of, hardware processing circuitry 700. In some embodiments, processor 616 and memory 618 (and/or other elements or components of eNB 610) may be arranged to perform the operations of hardware processing circuitry 700, such as operations described herein with reference to devices and circuitry within hardware processing circuitry 700. For example, one or more devices or circuits of hardware processing circuitry 700 may be implemented by combinations of software-configured elements and/or other hardware elements.

In some embodiments, hardware processing circuitry 700 may comprise one or more antenna ports 705 operable to provide various transmissions over a wireless communication channel (such as wireless communication channel 650). Antenna ports 705 may be coupled to one or more antennas 707 (which may be antennas 605). In some embodiments, hardware processing circuitry 700 may incorporate antennas 707, while in other embodiments, hardware processing circuitry 700 may merely be coupled to antennas 707.

Antenna ports 705 and antennas 707 may be operable to provide signals from an eNB to a wireless communications channel and/or a UE, and may be operable to provide signals from a UE and/or a wireless communications channel to an eNB. For example, antenna ports 705 and antennas 707 may be operable to provide transmissions from eNB 610 to wireless communication channel 650 (and from there to UE 630, or to another UE). Similarly, antennas 707 and antenna ports 705 may be operable to provide transmissions from a wireless communication channel 650 (and beyond that, from UE 630, or another UE) to eNB 610.

An apparatus of eNB 610 (or another eNB or base station) may be operable to communicate with a UE on a wireless network, and may comprise hardware processing circuitry 700. In some embodiments, the eNB (or other base station) may be a device comprising an application processor, a memory, one or more antenna ports, and an interface for allowing the application processor to communicate with another device.

With reference to FIG. 7, hardware processing circuitry 700 may comprise a first circuitry 710, a second circuitry 720, and a third circuitry 730. First circuitry 710 may be operable to provide a first transmission for a first CIoT device including a set of Narrowband System Information (NB-SI). The set of NB-SI may be intended for multiple CIoT devices. The first transmission may be provided to third circuitry 730 over first transmission interface 715. Second circuitry 720 may be operable to provide a second transmission for a second CIoT device including the set of NB-SI, e.g., including the same set of system information as included in the first transmission. The second transmission may be provided to third circuitry 730 over a second interface 725.

Third circuitry 730 may be operable to transmit the first transmission on a first NB wireless communication channel, and to transmit the second transmission on a second NB wireless communication channel. Third circuitry 730 may transmit various transmissions through antenna ports 705 and antennas 707. In some embodiments, third circuitry 730 may be operable to transmit an NB-PBCH transmission on a primary NB wireless communication channel.

In some embodiments, third circuitry 730 and/or eNB 610 may be operable to transmit at least one of an LTE PSS transmission and an SSS transmission on a set of subcarriers corresponding to a set of frequency resources within a wireless communication system bandwidth. In such embodiments, the first NB wireless communication channel and the second NB wireless communication channel may correspond to portions of the wireless communication system bandwidth outside the set of frequency resources. In some embodiments, the first NB wireless communication channel and the second NB wireless communication channel may be transmitted to one or more CIoT devices using frequency resources from within an LTE system bandwidth. The first NB wireless communication channel and the second NB wireless communication channel may correspond to sets of frequency bands outside of a set of subcarriers used for a PSS transmission and/or SSS transmission.

In some embodiments, the first NB wireless communication channel may be a primary NB wireless communication channel, first circuitry 710 may be operable to provide an NB-SCH transmission, and third circuitry 730 may be operable to transmit the NB-SCH transmission on the primary NB wireless communication channel.

For some embodiments of hardware processing circuitry 700, first circuitry 710 may be operable to provide an NB-PBCH transmission carrying NB-MIB configured to include at least one of: a number of DL NB wireless communication channels available; a location within an LTE wireless communication system bandwidth of each available NB wireless communication channel; a number of antennas available for DL transmissions by the eNB; at least partial scheduling and resource allocation information for an NB-SIB1; and an indicator identifying at least one NB wireless communication channel as one of an in-band channel deployed within the LTE wireless communication system bandwidth, or a stand-alone channel deployed outside the LTE wireless communication system bandwidth. For some embodiments, an LTE wireless communication system bandwidth may have a maximum of 100 contiguous-in-frequency LTE PRBs.

For various embodiments, first circuitry 710 may be operable to provide a next transmission for the first CIoT device. In such embodiments, third circuitry 730 may be operable to transmit the next transmission on an NB wireless communication channel that is different from the first NB wireless communication channel and is determined in accordance with a predetermined frequency hopping pattern. In such embodiments, hardware processing circuitry 700 may be operable to implement an FH pattern among a plurality of available NBs.

For some embodiments, first circuitry 710 may be operable to provide an NB-PDCCH transmission for the first CIoT device indicating an NB-PDSCH on a second NB wireless communication channel different from the first NB wireless communication channel. For such embodiments, third circuitry 730 may be operable to transmit the NB-PDCCH transmission on the first NB wireless communication channel.

In some embodiments, the first NB wireless communication channel may be a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidths. For various embodiments, first circuitry 710 may be operable to provide one or more RRC configuration transmissions to configure the first CIoT device to monitor a default NB for receiving a Narrowband Physical Downlink Control Channel (NB-PDCCH) transmission. For some embodiments, third circuitry 730 may be operable to indicate enhanced coverage to the first CIoT device by one of: a number of retransmissions indicated using Layer 1 control for unicast message reception or transmission, a mapping to a repetition level for the first CIoT device, and a value among a set of values mapped to a repetition level of the first CIoT device.

In some embodiments, first circuitry 710, second circuitry 720, and third circuitry 730 may be implemented as separate circuitries. In other embodiments, one or more of first circuitry 710, second circuitry 720, and third circuitry 730 may be combined and implemented together in a circuitry without altering the essence of the embodiments. In various embodiments, processor 616 (and/or one or more other processors which eNB 610 may comprise) may be arranged to perform the operations of first circuitry 710, second circuitry 720, and/or third circuitry 730. In such embodiments, first circuitry 710, second circuitry 720, and/or third circuitry 730 may accordingly be implemented by various combinations of software-configured elements (e.g., processor 616, and/or one or more other processors) and/or other hardware elements. In various embodiments, processor 616 (and/or one or more other processors which eNB 610 may comprise) may be a baseband processor.

Figure 8:
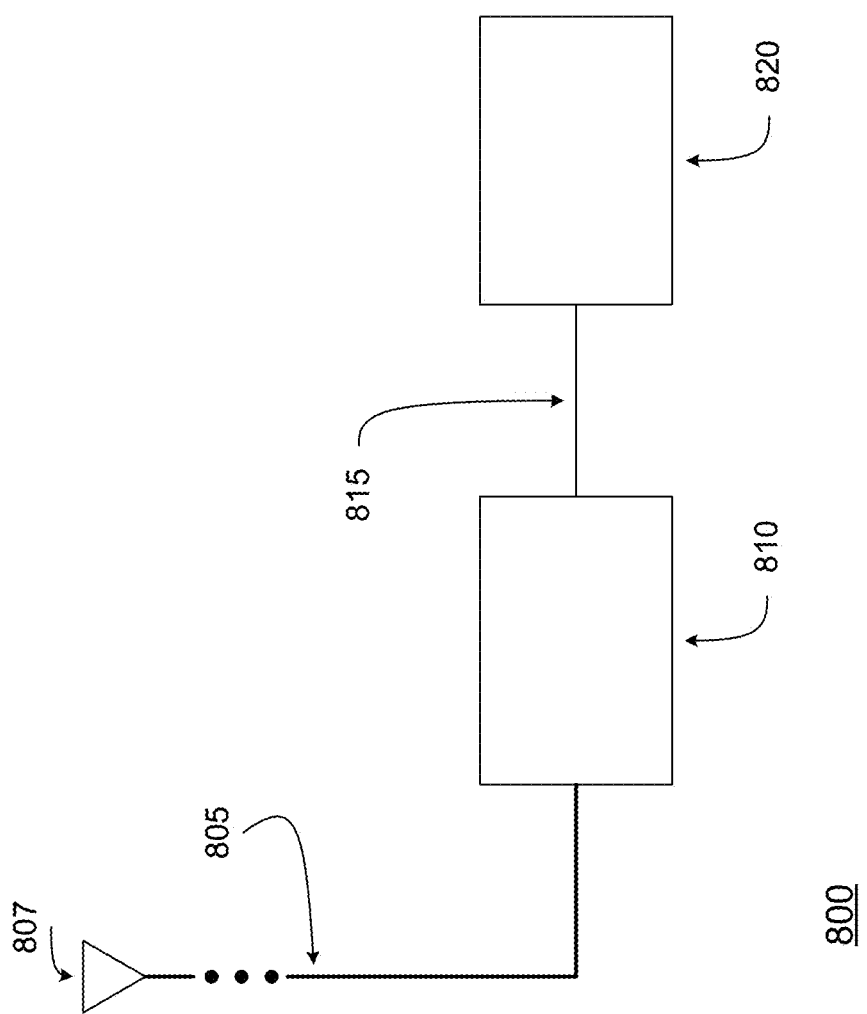
FIG. 8 illustrates hardware processing circuitry for a UE for NB-IoT operation, in accordance with some embodiments.

FIG. 8 illustrates hardware processing circuitry for a UE for NB-IoT operation, in accordance with some embodiments. A hardware processing circuitry 800 may comprise logic devices and/or circuitry operable to perform various operations. For example, with reference to FIGS. 6 and 8, UE 630 (or various elements or components therein, such as hardware processing circuitry 640, or combinations of elements or components therein) may include part of, or all of, hardware processing circuitry 800. In some embodiments, processor 636 and memory 638 (and/or other elements or components of UE 630) may be arranged to perform various operations of hardware processing circuitry 800, such as operations described herein with reference to devices and circuitry within hardware processing circuitry 800. For example, one or more devices or circuits of hardware processing circuitry 800 may be implemented by combinations of software-configured elements and/or other hardware elements.

In some embodiments, hardware processing circuitry 800 may comprise one or more antenna ports 805 operable to provide various transmissions over a wireless communication channel (such as wireless communication channel 650). Antenna ports 805 may be coupled to one or more antennas 807 (which may be antennas 605). In some embodiments, hardware processing circuitry 800 may incorporate antennas

807, while in other embodiments, hardware processing circuitry 800 may merely be coupled to antennas 807.

Antenna ports 805 and antennas 807 may be operable to provide signals from a UE to a wireless communications channel and/or an eNB, and may be operable to provide signals from an eNB and/or a wireless communications channel to a UE. For example, antenna ports 805 and antennas 807 may be operable to provide transmissions from UE 630 to wireless communication channel 650 (and from there to eNB 610, or to another eNB). Similarly, antennas 807 and antenna ports 805 may be operable to provide transmissions from a wireless communication channel 650 (and beyond that, from eNB 610, or another eNB) to UE 630.

An apparatus of UE 630 (or another UE or mobile handset) may be operable to communicate with an eNB on a wireless network, and may comprise hardware processing circuitry 800. In some embodiments, the UE (or other mobile handset) may be a device comprising an application processor, a memory, one or more antennas, a wireless interface for allowing the application processor to communicate with another device, and a touch-screen display.

With reference to FIG. 8, hardware processing circuitry 800 may comprise a first circuitry 810 and a second circuitry 820. First circuitry 810 may be operable to receive an SI transmission on one of a plurality of NB wireless communication channels, and may be operable to receive at least one of a PSS transmission and an SSS transmission on a set of subcarriers corresponding to a set of frequency bands. The plurality of NB wireless communication channels may be within a wireless communication system bandwidth, and at least two of the plurality of NB wireless communication channels may correspond to portions of the wireless communication system bandwidth outside the set of frequency bands.

In some embodiments, first circuitry 810 may be operable to receive, on one of a plurality of NB wireless communication channels, a transmission comprising one of an NB Primary Synchronization Signal (NB-PSS), an NB Secondary Synchronization Signal (NB-SSS), an NB-MIB, and an NB System Information Block (NB-SIB).

Second circuitry 820 may be operable to extract system information from at least one of a PSS transmission and a SSS transmission. First circuitry 810 may provide PSS transmission and/or SSS transmission to second circuitry 820 over an interface 815. In some embodiments, second circuitry 820 may be operable to extract synchronization information from an NB-SCH transmission, wherein one of the plurality of NB wireless communication channels may be a primary NB wireless communication channel, and wherein first circuitry 810 may be operable to receive the NB-SCH transmission on the primary NB wireless communication channel. In some embodiments, second circuitry 820 may be operable to extract time-and-frequency synchronization and system information from an NB-PSS transmission or an NB-SSS transmission.

For some embodiments, second circuitry 820 may be operable to extract information from an NB-MIB transmission. For such embodiments, the NB-MIB transmission may be configured to include one or more of: a number of DL NB wireless communication channels available; a location within a wireless communication system bandwidth of each available NB wireless communication channel; a number of antennas available for DL transmissions by the eNB; at least partial scheduling and resource allocation information for an NB-SIB1; and an indicator identifying at least one NB wireless communication channel as one of an in-band channel within the wireless communication system bandwidth or a stand-alone channel outside the wireless communication system bandwidth. In various embodiments, an LTE wireless communication system bandwidth may have a maximum of 100 contiguous-in-frequency LTE PRBs.

In some embodiments, first circuitry 810 may be operable to receive a first transmission on a first NB wireless communication channel, and may be operable to receive a next transmission following the first transmission on a second NB wireless communication channel, where the first NB wireless communication channel is different from the second NB wireless communication channel.

In various embodiments, first circuitry 810 may be operable to receive an NB-PDCCH transmission on a first NB wireless communication channel. First circuitry 810 may then provide the NB-PDCCH transmission to second circuitry 820 over interface 815. Second circuitry 820 may be operable to extract a channel assignment for an NB-PDSCH transmission from the NB-PDCCH transmission, in which the channel assignment indicates a second NB wireless communication channel different from the first NB wireless communication channel. In such embodiments, first circuitry 810 may be operable to receive the NB-PDSCH transmission on the second NB wireless communication channel.

For some embodiments, one of the NB wireless communication channels may be a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidths. In various embodiments, first circuitry 810 may be operable to receive one or more RRC configuration transmissions to configure the first CIoT device to monitor a default NB for receiving a Narrowband Physical Downlink Control Channel (NB-PDCCH) transmission. In some embodiments, second circuitry 820 may be operable to extract an indication of enhanced coverage from the eNB by one of: a number of retransmissions indicated using Layer 1 control for unicast message reception or transmission, a mapping to a repetition level for the first CIoT device, and a value among a set of values mapped to a repetition level of the first CIoT device.

In some embodiments, first circuitry 810 and second circuitry 820 may be implemented as separate circuitries. In other embodiments, one or more of first circuitry 810 and second circuitry 820 may be combined and implemented together in a circuitry without altering the essence of the embodiments. In various embodiments, processor 636 (and/or one or more other processors which UE 630 may comprise) may be arranged to perform the operations of first circuitry 810 and/or second circuitry 820. In such embodiments, first circuitry 810 and/or second circuitry 820 may accordingly be implemented by various combinations of software-configured elements (e.g., processor 636, and/or one or more other processors) and/or other hardware elements. In various embodiments, processor 636 (and/or one or more other processors which UE 630 may comprise) may be a baseband processor.

Figure 9:
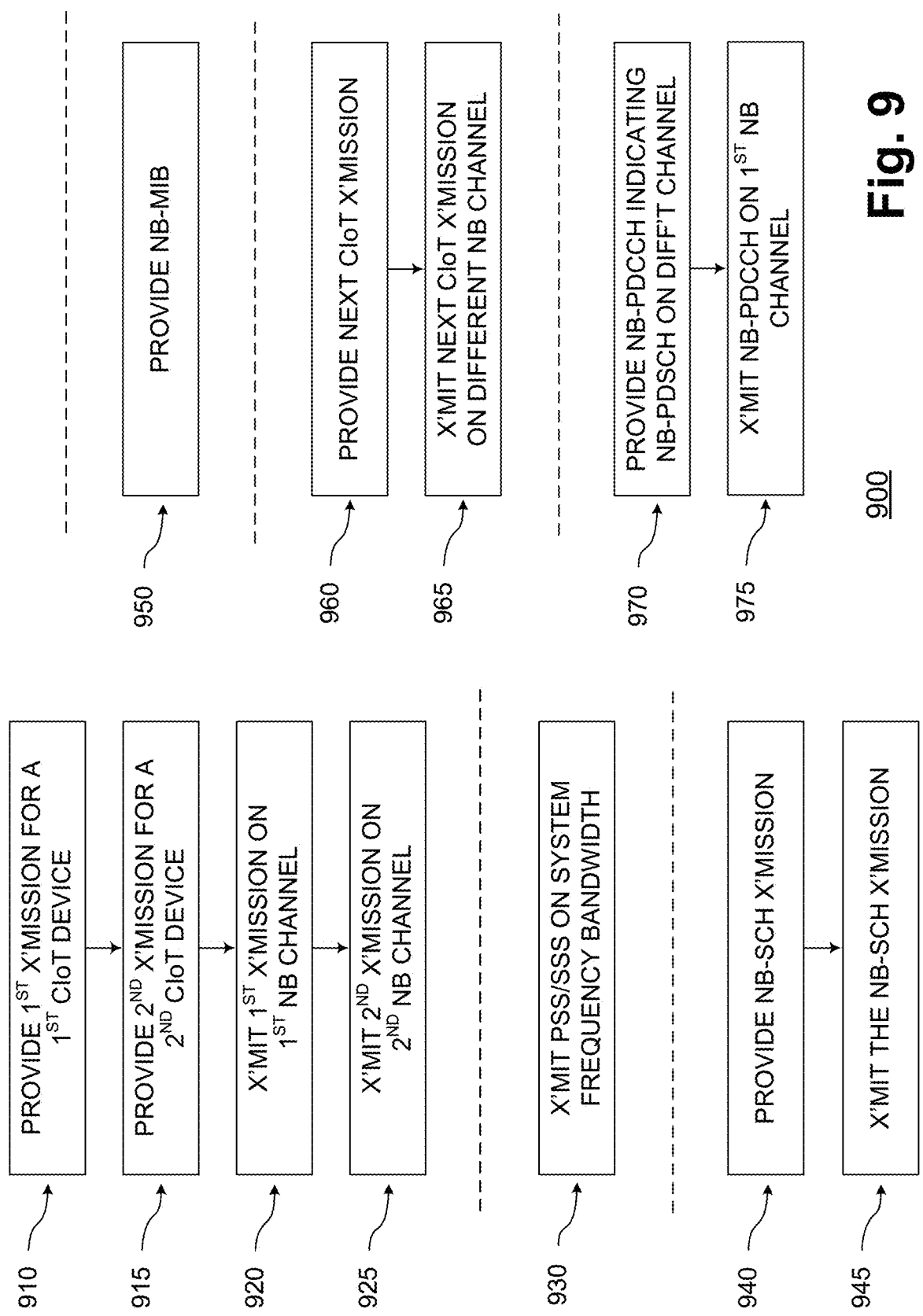
FIG. 9 illustrates methods for an eNB for NB-IoT operation, in accordance with some embodiments.

FIG. 9 illustrates methods for an eNB for NB-IoT operation, in accordance with some embodiments. A method 900 may comprise a providing 910, a providing 915, a transmitting 920, and a transmitting 925. In providing 910, a first transmission for a first CIoT device including a set of system information may be provided for an eNB. In providing 915, a second transmission for a second CIoT device including the set of system information may be provided. In transmission 920, the first transmission may be transmitted on a first NB wireless communication channel. Similarly, in transmission 925, the second transmission may be transmitted on a second narrowband NB wireless communication channel.

Some embodiments of method 900 may comprise a transmission 930. In transmission 930, at least one of a PSS transmission and an SSS transmission on a set of subcarriers corresponding to a set of frequency bands within a wireless communication system bandwidth may be transmitted. In such embodiments, the first NB wireless communication channel and the second NB wireless communication channel may correspond to portions of the wireless communication system bandwidth outside the set of frequency bands.

In various embodiments, method 900 may comprise a providing 940 and a transmitting 945. In providing 940, an NB-SCH transmission may be provided. In such embodiments, the first NB wireless communication channel may be a primary NB wireless communication channel. In transmitting 945, the NB-SCH transmission may be transmitted on the primary NB wireless communication channel.

For some embodiments, method 900 may comprise a providing 950. In providing 950, an NB-MIB may be provided. The NB-MIB may include at least one of: a number of DL NB wireless communication channels available; a location within a wireless communication system bandwidth of each available NB wireless communication channel; a number of antennas available for DL transmissions by the eNB; at least partial scheduling and resource allocation information for an NB-SIB1; and an indicator identifying at least one NB wireless communication channel as one of an in-band channel within the wireless communication system bandwidth or a stand-alone channel outside the wireless communication system bandwidth.

Method 900 may also comprise a providing 960 and a transmitting 965. In providing 960, a next transmission for the first CIoT device may be provided. In transmitting 965, the next transmission may be transmitted on an NB wireless communication channel that is different from the first NB wireless communication channel and is determined in accordance with a predetermined frequency hopping pattern.

In some embodiments, method 900 may comprise a providing 970 and a transmitting 975. In providing 970, an NB-PDCCH transmission for the first CIoT device may be provided. The NB-PDCCH transmission may indicate an NB-PDSCH on an NB wireless communication channel different from the first NB wireless communication channel. In transmitting 975, the NB-PDCCH transmission may be transmitted on the first NB wireless communication channel.

Figure 10:
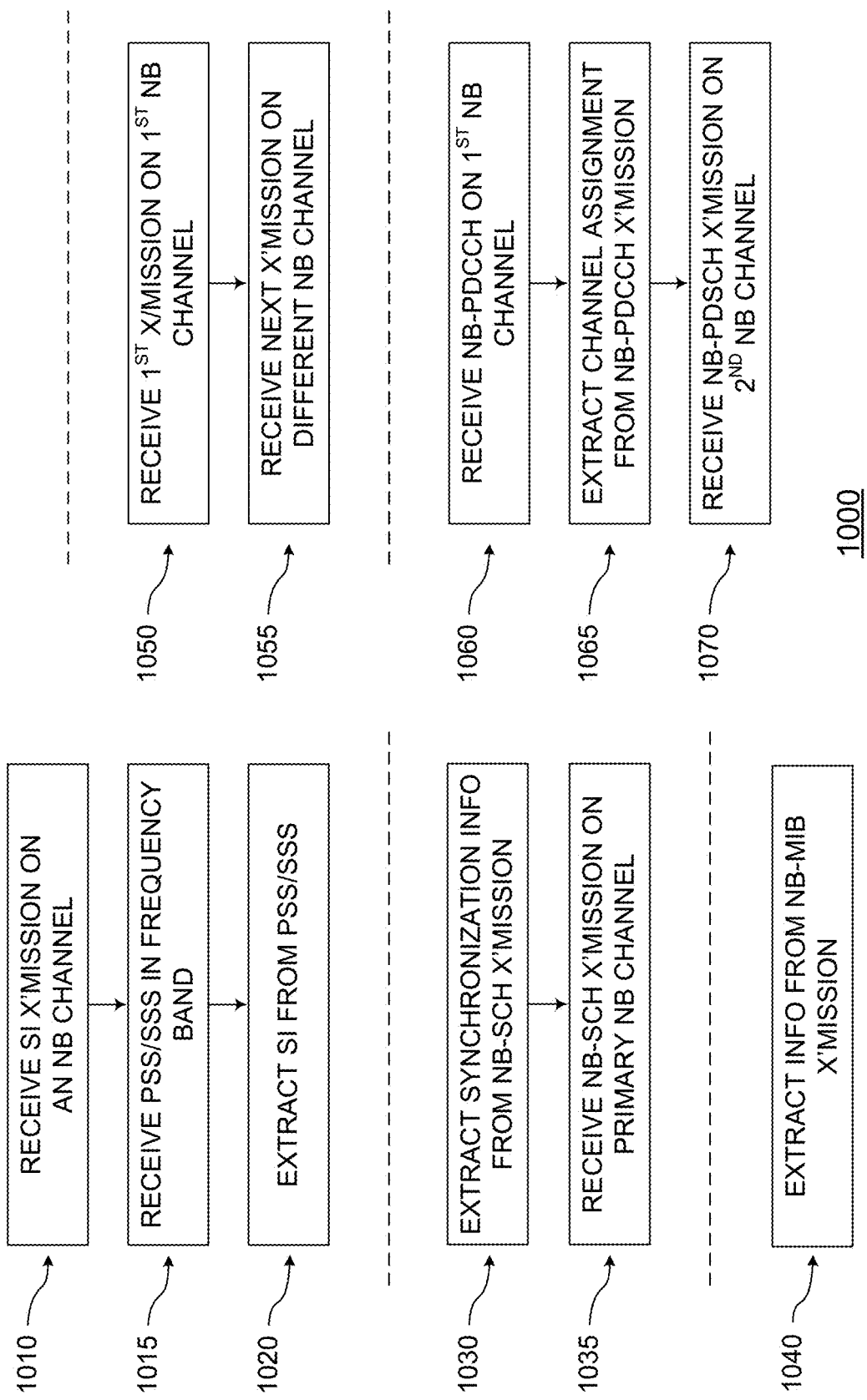
FIG. 10 illustrates methods for a UE for NB-IoT operation, in accordance with some embodiments.

FIG. 10 illustrates methods for a UE for NB-IoT operation, in accordance with some embodiments. A method 1000 may comprise a receiving 1010, a receiving 1015, and an extracting 1020. In receiving 1010, a SI transmission on one of a plurality of NB wireless communication channels may be received for a Cellular Internet-of-Things (CIoT) device. In receiving 1015, at least one of a PSS transmission and an SSS transmission may be received on a set of subcarriers corresponding to a set of frequency bands. In extracting 1020, system information may be extracted from at least one of the PSS transmission and the SSS transmission. The plurality of NB wireless communication channels may be within a wireless communication system bandwidth, and at least two of the plurality of NB wireless communication channels may correspond to portions of the wireless communication system bandwidth outside the set of frequency bands.

In some embodiments, method 1000 may comprise an extracting 1030 and a receiving 1035. In extracting 1030, synchronization information may be extracted from an NB-SCH transmission. One of the plurality of NB wireless communication channels may be a primary NB wireless communication channel, and in receiving 1035, the NB-SCH transmission may be received on the primary NB wireless communication channel.

Various embodiments of method 1000 may comprise an extracting 1040. In extracting 1040, information may be extracted from an NB-MIB transmission. The NB-MIB transmission may be configured to include one or more of: a number of DL NB wireless communication channels available; a location within a wireless communication system bandwidth of each available NB wireless communication channel; a number of antennas available for DL transmissions by the eNB; at least partial scheduling and resource allocation information for an NB-SIB1; and an indicator identifying at least one NB wireless communication channel as one of an in-band channel within the wireless communication system bandwidth or a stand-alone channel outside the wireless communication system bandwidth.

Some embodiments of method 1000 may comprise a receiving 1050 and a receiving 1055. In receiving 1050, a first transmission may be received on a first NB wireless communication channel. In receiving 1055, a next transmission following the first transmission may be received on a second NB wireless communication channel. In such embodiments, the first NB wireless communication channel may be different from the second NB wireless communication channel.

Various embodiments of method 1000 may comprise a receiving 1060, an extracting 1065, and a receiving 1070. In receiving 1060, an NB-PDCCH transmission may be received on a first NB wireless communication channel. In extracting 1065, a channel assignment for an NB-PDSCH transmission may be extracted from the NB-PDCCH transmission, in which the channel assignment indicates a second NB wireless communication channel different from the first NB wireless communication channel. In receiving 1070, the NB-PDSCH transmission may be received on the second NB wireless communication channel.

Although the actions in the flowcharts with reference to FIGS. 9 and 10 are shown in a particular order, the order of the actions can be modified. Thus, the illustrated embodiments can be performed in a different order, and some actions may be performed in parallel. Some of the actions and/or operations listed in FIGS. 9 and 10 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 610 and/or hardware processing circuitry 620 to perform an operation comprising method 900. Similarly, in some embodiments, machine readable storage media may have executable instructions that, when executed, cause UE 630 and/or hardware processing circuitry 640 to perform an operation comprising method 1000. Such machine readable storage media may include any of a variety of storage media, like magnetic storage media (e.g. magnetic tapes or magnetic disks), optical storage media (e.g. optical discs), electronic storage media (e.g. conventional hard disk drives, solid-state disk drives, or flash-memory-based storage media), or any other tangible storage media or non-transitory storage media.

Figure 11:
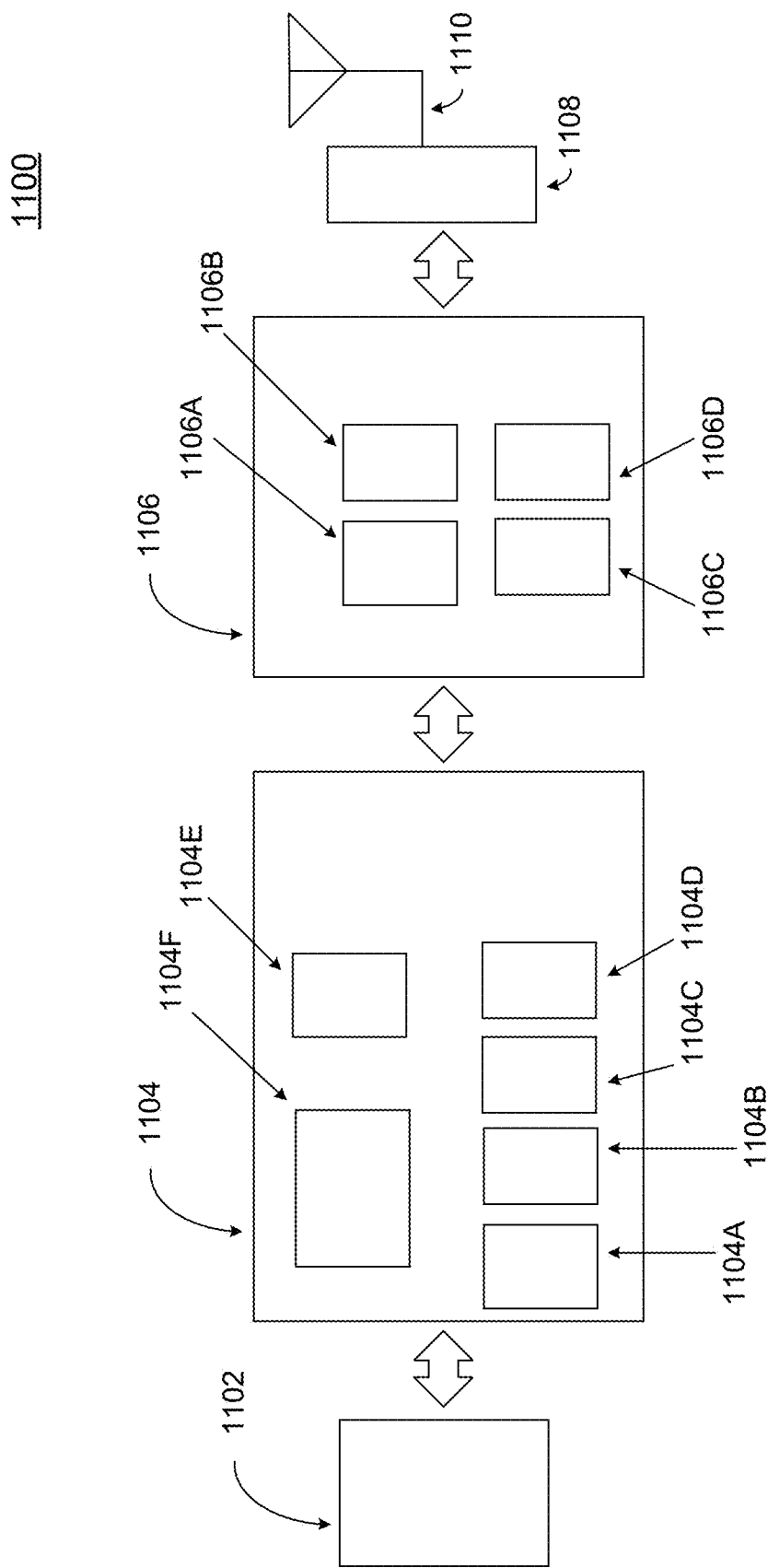
FIG. 11 illustrates example components of a UE device, in accordance with some embodiments.

FIG. 11 illustrates example components of a UE device 1100, in accordance with some embodiments. In some embodiments, the UE device 1100 may include application circuitry 1102, baseband circuitry 1104, Radio Frequency (RF) circuitry 1106, front-end module (FEM) circuitry 1108, a low-power wake-up receiver (LP-WUR), and one or more antennas 1110, coupled together at least as shown. In some embodiments, the UE device 1100 may include additional elements such as, for example, memory/storage, display, camera, sensor, and/or input/output (I/O) interface.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuity 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104*a*, third generation (3G) baseband processor 1104*b*, fourth generation (4G) baseband processor 1104*c*, and/or other baseband processor(s) 1104*d* for other existing generations, generations in development or to be developed in the future (e.g., fifth generation (5G), 6G, etc.). The baseband circuitry 1104 (e.g., one or more of baseband processors 1104*a-d*) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1104*e* of the baseband circuitry 1104 may be configured to run elements of the protocol stack for signaling of the PHY, MAC, RLC, PDCP and/or RRC layers. In some embodiments, the baseband circuitry may include one or more audio digital signal processor(s) (DSP) 1104*f*. The audio DSP(s) 1104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106*a*, amplifier circuitry 1106*b* and filter circuitry 1106*c*. The transmit signal path of the RF circuitry 1106 may include filter circuitry 1106*c* and mixer circuitry 1106*a*. RF circuitry 1106 may also include synthesizer circuitry 1106*d* for synthesizing a frequency for use by the mixer circuitry 1106*a* of the receive signal path and the transmit signal path. In some embodiments, the mixer circuitry 1106*a* of the receive signal path may be configured to down-convert RF signals received from the FEM circuitry 1108 based on the synthesized frequency provided by synthesizer circuitry 1106*d*. The amplifier circuitry 1106*b* may be configured to amplify the down-converted signals and the filter circuitry 1106*c* may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106*a* of the receive signal path may comprise passive mixers, although the scope of the embodiments is not limited in this respect.

In some embodiments, the mixer circuitry 1106*a* of the transmit signal path may be configured to up-convert input baseband signals based on the synthesized frequency provided by the synthesizer circuitry 1106*d* to generate RF output signals for the FEM circuitry 1108. The baseband signals may be provided by the baseband circuitry 1104 and may be filtered by filter circuitry 1106*c*. The filter circuitry 1106*c* may include a low-pass filter (LPF), although the scope of the embodiments is not limited in this respect.

In some embodiments, the mixer circuitry 1106*a* of the receive signal path and the mixer circuitry 1106*a* of the transmit signal path may include two or more mixers and may be arranged for quadrature downconversion and/or upconversion respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and/or direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110.

In some embodiments, the UE 1100 comprises a plurality of power saving mechanisms. If the UE 1100 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where again it periodically wakes up to listen to the network and then powers down again. The device cannot receive data in this state, in order to receive data, it should transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of an Evolved Node B (eNB) operable to communicate with at least one Cellular Internet-of-Things (CIoT) device on a wireless network, comprising: one or more processors to: generate a first transmission for a first CIoT device on a first Narrowband (NB) wireless communication channel, the first transmission including a set of Narrowband System Information (NB-SI); and generate a second transmission for a second CIoT device on a second NB wireless communication channel, the second transmission including the set of NB-SI.

In example 2, the apparatus of example 1, wherein the one or more processors are further to: generate at least one of a Long-Term Evolution (LTE) Primary Synchronization Signal (PSS) transmission and an LTE Secondary Synchronization Signal (SSS) transmission for a set of subcarriers corresponding to a set of frequency resources within a wireless communication system bandwidth, wherein the first NB wireless communication channel and the second NB wireless communication channel correspond to portions of the wireless communication system bandwidth outside the set of frequency resources.

In example 3, the apparatus of either of examples 1 or 2, wherein the first NB wireless communication channel is a primary NB wireless communication channel, and wherein the one or more processors are further to: generate a Narrowband Synchronization Channel (NB-SCH) transmission on the primary NB wireless communication channel.

In example 4, the apparatus of any of examples 1 through 3, wherein the one or more processors are further to: generate a Narrowband Physical Broadcast Channel (NB-PBCH) transmission for the primary NB wireless communication channel, the NB-PBCH transmission carrying a Narrowband Master Information Block (NB-MIB) configured to include at least one of: a number of Downlink (DL) NB wireless communication channels available; a location within a Long-Term Evolution (LTE) wireless communication system bandwidth of each available NB wireless communication channel; a number of antennas available for DL transmissions by the eNB; at least partial scheduling and resource allocation information for a Narrowband System Information Block Type 1 (NB-SIB1); or an indicator identifying at least one NB wireless communication channel as one of an in-band channel deployed within the LTE wireless communication system bandwidth or a stand-alone channel deployed outside the LTE wireless communication system bandwidth.

In example 5, the apparatus of any of examples 1 through 4, wherein the one or more processors are further to: generate a next transmission for the first CIoT device for an NB wireless communication channel that is different from the first NB wireless communication channel and is determined in accordance with a predetermined frequency hopping pattern.

In example 6, the apparatus of any of examples 1 through 5, wherein the one or more processors are further to: generate a Narrowband Physical Downlink Control Channel (NB-PDCCH) transmission for the first CIoT device on the first NB wireless communication channel, the NB-PDCCH transmission indicating a Narrowband Physical Downlink Shared Channel assignment (NB-PDSCH) on a second NB wireless communication channel different from the first NB wireless communication channel.

In example 7, the apparatus of any of examples 1 through 6, wherein the first NB wireless communication channel is a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidths.

In example 8, the apparatus of any of examples 1 through 7, wherein the one or more processors are further to: generate one or more RRC configuration transmissions to configure the first CIoT device to monitor a default NB for receiving a Narrowband Physical Downlink Control Channel (NB-PDCCH) transmission.

In example 9, the apparatus of any of examples 1 through 8, wherein the one or more processors are further to: indicate enhanced coverage to the first CIoT device by one of: a number of retransmissions indicated using Layer 1 control for unicast message reception or transmission, a mapping to a repetition level for the first CIoT device, or a value among a set of values mapped to a repetition level of the first CIoT device.

Example 10 provides an eNB device comprising an application processor, a memory, one or more antenna ports, and an interface for allowing the application processor to communicate with another device, the eNB device including the apparatus of any of examples 1 through 9.

Example 11 provides machine readable storage media having machine executable instructions that, when executed, cause one or more processors to perform an operation comprising: generate, for an Evolved Node B (eNB), a first transmission for a first Cellular Internet-of-Things (CIoT) device on a first Narrowband (NB) wireless communication channel, the first transmission including a set of Narrowband System Information (NB-SI); generate a second transmission for a second CIoT device on a second narrowband NB wireless communication channel, the second transmission including the set of (NB-SI).

In example 12, the machine readable storage media of example 11, the operation comprising: generate at least one of a Long-Term Evolution (LTE) Primary Synchronization Signal (PSS) transmission and an LTE Secondary Synchronization Signal (SSS) transmission for a set of subcarriers corresponding to a set of frequency resources within a wireless communication system bandwidth, wherein the first NB wireless communication channel and the second NB wireless communication channel correspond to portions of the wireless communication system bandwidth outside the set of frequency resources.

In example 13, the machine readable storage media of either of examples 11 or 12, wherein the first NB wireless communication channel is a primary NB wireless communication channel, the operation comprising: generate a Narrowband Synchronization Channel (NB-SCH) transmission on the primary NB wireless communication channel.

In example 14, the machine readable storage media of any of examples 11 through 13, the operation comprising: generate a Narrowband Physical Broadcast Channel (NB-PBCH) transmission for the primary NB wireless communication channel, the NB-PBCH transmission carrying a Narrowband Master Information Block (NB-MIB) configured to include at least one of: a number of Downlink (DL) NB wireless communication channels available; a location within a Long-Term Evolution (LTE) wireless communication system bandwidth of each available NB wireless communication channel; a number of antennas available for DL transmissions by the eNB; at least partial scheduling and resource allocation information for a Narrowband System Information Block Type 1 (NB-SIB1); or an indicator identifying at least one NB wireless communication channel as one of an in-band channel deployed within the LTE wireless communication system bandwidth or a stand-alone channel deployed outside the LTE wireless communication system bandwidth.

In example 15, the machine readable storage media of any of examples 11 through 14, the operation comprising: generate a next transmission for the first CIoT device for an NB wireless communication channel that is different from the first NB wireless communication channel and is determined in accordance with a predetermined frequency hopping pattern.

In example 16, the machine readable storage media of any of examples 11 through 15, the operation comprising: generate a Narrowband Physical Downlink Control Channel (NB-PDCCH) transmission for the first CIoT device on the first NB wireless communication channel, the NB-PDCCH transmission indicating a Narrowband Physical Downlink Shared Channel assignment (NB-PDSCH) on an NB wireless communication channel different from the first NB wireless communication channel.

In example 17, the machine readable storage media of any of examples 11 through 16, wherein the first NB wireless communication channel is a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidth.

In example 18, the machine readable storage media of any of examples 11 through 17, the operation comprising: generate one or more RRC configuration transmissions to configure the first CIoT device to monitor a default NB for receiving a Narrowband Physical Downlink Control Channel (NB-PDCCH) transmission.

In example 19, the machine readable storage media of any of examples 11 through 18, the operation comprising: indicate enhanced coverage to the first CIoT device by one of: a number of retransmissions indicated using Layer 1 control for unicast message reception or transmission, a mapping to a repetition level for the first CIoT device, or a value among a set of values mapped to a repetition level of the first CIoT device.

Example 20 provides a method comprising: generating, for an Evolved Node B (eNB), a first transmission for a first Cellular Internet-of-Things (CIoT) device on a first Narrowband (NB) wireless communication channel, the first transmission including a set of Narrowband System Information (NB-SI); generating a second transmission for a second CIoT device on a second narrowband NB wireless communication channel, the second transmission including the set of (NB-SI).

In example 21, the method of example 20, comprising: generating at least one of a Long-Term Evolution (LTE) Primary Synchronization Signal (PSS) transmission and an LTE Secondary Synchronization Signal (SSS) transmission for a set of subcarriers corresponding to a set of frequency resources within a wireless communication system bandwidth, wherein the first NB wireless communication channel and the second NB wireless communication channel correspond to portions of the wireless communication system bandwidth outside the set of frequency resources.

In example 22, the method of either of examples 20 or 21, wherein the first NB wireless communication channel is a primary NB wireless communication channel, the operation comprising: generating a Narrowband Synchronization Channel (NB-SCH) transmission on the primary NB wireless communication channel.

In example 23, the method of any of examples 20 through 22, comprising: generating a Narrowband Physical Broadcast Channel (NB-PBCH) transmission for the primary NB wireless communication channel, the NB-PBCH transmission carrying a Narrowband Master Information Block (NB-MIB) configured to include at least one of: a number of Downlink (DL) NB wireless communication channels available; a location within a Long-Term Evolution (LTE) wireless communication system bandwidth of each available NB wireless communication channel; a number of antennas available for DL transmissions by the eNB; at least partial scheduling and resource allocation information for a Narrowband System Information Block Type 1 (NB-SIB1); or an indicator identifying at least one NB wireless communication channel as one of an in-band channel deployed within the LTE wireless communication system bandwidth or a stand-alone channel deployed outside the LTE wireless communication system bandwidth.

In example 24, the method of any of examples 20 through 23, comprising: generating a next transmission for the first CIoT device for an NB wireless communication channel that is different from the first NB wireless communication channel and is determined in accordance with a predetermined frequency hopping pattern.

In example 25, the method of any of examples 20 through 24, comprising: generating a Narrowband Physical Downlink Control Channel (NB-PDCCH) transmission for the first CIoT device on the first NB wireless communication channel, the NB-PDCCH transmission indicating a Narrowband Physical Downlink Shared Channel assignment (NB-PDSCH) on an NB wireless communication channel different from the first NB wireless communication channel.

In example 26, the method of any of examples 20 through 25, wherein the first NB wireless communication channel is a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidth.

In example 27, the method of any of examples 20 through 26, comprising: generating one or more RRC configuration transmissions to configure the first CIoT device to monitor a default NB for receiving a Narrowband Physical Downlink Control Channel (NB-PDCCH) transmission.

In example 28, the method of any of examples 20 through 27, comprising: indicating enhanced coverage to the first CIoT device by one of: a number of retransmissions indicated using Layer 1 control for unicast message reception or transmission, a mapping to a repetition level for the first CIoT device, or a value among a set of values mapped to a repetition level of the first CIoT device.

Example 29 provides machine readable storage media having machine executable instructions stored thereon that, when executed, cause one or more processors to perform a method according to any one of examples 20 through 28.

Example 30 provides an apparatus of an Evolved Node B (eNB) operable to communicate with at least one Cellular Internet-of-Things (CIoT) device on a wireless network, comprising: means for generating a first transmission for a first Cellular Internet-of-Things (CIoT) device on a first Narrowband (NB) wireless communication channel, the first transmission including a set of Narrowband System Information (NB-SI); means for generating a second transmission for a second CIoT device on a second narrowband NB wireless communication channel, the second transmission including the set of (NB-SI).

In example 31, the apparatus of example 30, comprising: means for generating at least one of a Long-Term Evolution (LTE) Primary Synchronization Signal (PSS) transmission and an LTE Secondary Synchronization Signal (SSS) transmission for a set of subcarriers corresponding to a set of frequency resources within a wireless communication system bandwidth, wherein the first NB wireless communication channel and the second NB wireless communication channel correspond to portions of the wireless communication system bandwidth outside the set of frequency resources.

In example 32, the apparatus of either of examples 30 or 31, wherein the first NB wireless communication channel is a primary NB wireless communication channel, the operation comprising: means for generating a Narrowband Synchronization Channel (NB-SCH) transmission on the primary NB wireless communication channel.

In example 33, the apparatus of any of examples 30 through 32, comprising: means for generating a Narrowband Physical Broadcast Channel (NB-PBCH) transmission for the primary NB wireless communication channel, the NB-PBCH transmission carrying a Narrowband Master Information Block (NB-MIB) configured to include at least one of: a number of Downlink (DL) NB wireless communication channels available; a location within a Long-Term Evolution (LTE) wireless communication system bandwidth of each available NB wireless communication channel; a number of antennas available for DL transmissions by the eNB; at least partial scheduling and resource allocation information for a Narrowband System Information Block Type 1 (NB-SIB1); or an indicator identifying at least one NB wireless communication channel as one of an in-band channel deployed within the LTE wireless communication system bandwidth or a stand-alone channel deployed outside the LTE wireless communication system bandwidth.

In example 34, the apparatus of any of examples 30 through 33, comprising: means for generating a next transmission for the first CIoT device for an NB wireless communication channel that is different from the first NB wireless communication channel and is determined in accordance with a predetermined frequency hopping pattern.

In example 35, the apparatus of any of examples 30 through 34, comprising: means for generating a Narrowband Physical Downlink Control Channel (NB-PDCCH) transmission for the first CIoT device on the first NB wireless communication channel, the NB-PDCCH transmission indicating a Narrowband Physical Downlink Shared Channel assignment (NB-PDSCH) on an NB wireless communication channel different from the first NB wireless communication channel.

In example 36, the apparatus of any of examples 30 through 35, wherein the first NB wireless communication channel is a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidth.

In example 37, the apparatus of any of examples 30 through 36, comprising: means for generating one or more RRC configuration transmissions to configure the first CIoT device to monitor a default NB for receiving a Narrowband Physical Downlink Control Channel (NB-PDCCH) transmission.

In example 38, the apparatus of any of examples 30 through 37, comprising: means for indicating enhanced coverage to the first CIoT device by one of: a number of retransmissions indicated using Layer 1 control for unicast message reception or transmission, a mapping to a repetition level for the first CIoT device, or a value among a set of values mapped to a repetition level of the first CIoT device.

Example 39 provides an apparatus of a Cellular Internet of Things (CIoT) device operable to communicate with an Evolved Node B (eNB) on a wireless network, comprising: one or more processors to: process, from one of a plurality of Narrowband (NB) wireless communication channels, a transmission comprising one of: an NB Primary Synchronization Signal (PSS), an NB Secondary Synchronization Signal (SSS), an NB Master Information Block (NB-MIB), or an NB System Information Block (NB-SIB); and extract time-and-frequency synchronization and system information from the transmission, wherein the plurality of NB wireless communication channels are within a wireless communication system bandwidth; and wherein at least two of the plurality of NB wireless communication channels correspond to portions of the wireless communication system bandwidth outside a set of frequency resources used to transmit Long-Term Evolution (LTE) Primary Synchronization Signals (PSS) and LTE Secondary Synchronization Signals (SSS).

In example 40, the apparatus of example 39, wherein one of the plurality of NB wireless communication channels is a primary NB wireless communication channel, and wherein the one or more processors are further to: extract synchronization information from a Narrowband Synchronization Channel (NB-SCH) transmission; and process the NB-SCH transmission on the primary NB wireless communication channel.

In example 41, the apparatus of either of examples 39 or 40, wherein the one or more processors are further to: extract information from an NB-MIB transmission; and wherein the NB-MIB transmission is configured to include one or more of: a number of Downlink (DL) NB wireless communication channels available; a location within an LTE wireless communication system bandwidth of each available NB wireless communication channel; a number of antennas available for DL transmissions by the eNB; at least partial scheduling and resource allocation information for a Narrowband System Information Block Type 1 (NB-SIB1); or an indicator identifying at least one NB wireless communication channel as one of an in-band channel deployed within an LTE wireless communication system bandwidth or a stand-alone channel deployed outside the LTE wireless communication system bandwidth.

In example 42, the apparatus of any of examples 39 through 41, wherein the one or more processors are further to: process a first transmission on a first NB wireless communication channel; and process a next transmission following the first transmission on a second NB wireless communication channel, the first NB wireless communication channel being different from the second NB wireless communication channel.

In example 43, the apparatus of any of examples 39 through 42, wherein the one or more processors are further to: process a Narrowband Physical Downlink Control Channel (NB-PDCCH) transmission on a first NB wireless communication channel; extract a channel assignment for a Narrowband Physical Downlink Shared Channel (NB-PDSCH) transmission from the NB-PDCCH transmission, the channel assignment indicating a second NB wireless communication channel different from the first NB wireless communication channel; and process the NB-PDSCH transmission on the second NB wireless communication channel.

In example 44, the apparatus of any of examples 39 through 43, wherein one of the NB wireless communication channels is a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidths.

In example 45, the apparatus of any of examples 39 through 44, wherein the one or more processors are further to: process one or more RRC configuration transmissions to configure the first CIoT device to monitor a default NB for receiving a Narrowband Physical Downlink Control Channel (NB-PDCCH) transmission.

In example 46, the apparatus of any of examples 39 through 45, wherein the one or more processors are further to: extract an indication of enhanced coverage from the eNB by one of: a number of retransmissions indicated using Layer 1 control for unicast message reception or transmission, a mapping to a repetition level for the first CIoT device, or a value among a set of values mapped to a repetition level of the first CIoT device.

Example 47 provides a CIoT device comprising an application processor, a memory, one or more antennas, and a wireless interface for allowing the application processor to communicate with another device, the CIoT device including the apparatus of any of examples 39 through 43.

Example 48 provides machine readable storage media having machine executable instructions that, when executed, cause one or more processors to perform an operation comprising: process, for a Cellular Internet-of-Things (CIoT) device, and from on one of a plurality of Narrowband (NB) wireless communication channels, a transmission comprising one of: a Narrowband Primary Synchronization Signal (NB-PSS), a Narrowband Secondary Synchronization Signal (NB-SSS), a Narrowband NB Master Information Block (NB-MIB), or a Narrowband NB System Information Block (NB-SIB); and extract time-and-frequency synchronization and system information from the transmission, wherein the plurality of NB wireless communication channels are within a wireless communication system bandwidth; and wherein at least two of the plurality of NB wireless communication channels correspond to portions of the wireless communication system bandwidth outside a set of frequency resources used to transmit Long-Term Evolution (LTE) Primary Synchronization Signals (PSS) and LTE Secondary Synchronization Signals (SSS).

In example 49, the machine readable storage media of example 48, wherein one of the plurality of NB wireless communication channels is a primary NB wireless communication channel, the operation comprising: extract synchronization information from a Narrowband Synchronization Channel (NB-SCH) transmission; and process the NB-SCH transmission on the primary NB wireless communication channel.

In example 50, the machine readable storage media of either of examples 48 or 49, the operation comprising: extract information from an NB-MIB transmission, wherein the NB-MIB transmission is configured to include one or more of: a number of Downlink (DL) NB wireless communication channels available; a location within an LTE wireless communication system bandwidth of each available NB wireless communication channel; a number of antennas available for DL transmissions by the eNB; at least partial scheduling and resource allocation information for a Narrowband System Information Block Type 1 (NB-SIB1); or an indicator identifying at least one NB wireless communication channel as one of an in-band channel deployed within an LTE wireless communication system bandwidth or a stand-alone channel deployed outside the LTE wireless communication system bandwidth.

In example 51, the machine readable storage media of any of examples 48 through 50, the operation comprising: process a first transmission on a first NB wireless communication channel; and process a next transmission following the first transmission on a second NB wireless communication channel, the first NB wireless communication channel being different from the second NB wireless communication channel.

In example 52, the machine readable storage media of any of examples 48 through 51, the operation comprising: process a Narrowband Physical Downlink Control Channel (NB-PDCCH) transmission on a first NB wireless communication channel; extract a channel assignment for a Narrowband Physical Downlink Shared Channel (NB-PDSCH) transmission from the NB-PDCCH transmission, the channel assignment indicating a second NB wireless communication channel different from the first NB wireless communication channel; and process the NB-PDSCH transmission on the second NB wireless communication channel.

In example 53, the machine readable storage media of any of examples 48 through 52, wherein one of the NB wireless communication channels is a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidths.

In example 54, the machine readable storage media of any of examples 48 through 53, the operation comprising: process one or more RRC configuration transmissions to configure the first CIoT device to monitor a default NB for receiving a Narrowband Physical Downlink Control Channel (NB-PDCCH) transmission.

In example 55, the machine readable storage media of any of examples 48 through 54, the operation comprising: extract an indication of enhanced coverage from the eNB by one of: a number of retransmissions indicated using Layer 1 control for unicast message reception or transmission, a mapping to a repetition level for the first CIoT device, or a value among a set of values mapped to a repetition level of the first CIoT device.

Example 56 provides a method comprising: processing, for a Cellular Internet-of-Things (CIoT) device, and from on one of a plurality of Narrowband (NB) wireless communication channels, a transmission comprising one of: a Narrowband Primary Synchronization Signal (NB-PSS), a Narrowband Secondary Synchronization Signal (NB-SSS), a Narrowband NB Master Information Block (NB-MIB), or a Narrowband NB System Information Block (NB-SIB); and extracting time-and-frequency synchronization and system information from the transmission, wherein the plurality of NB wireless communication channels are within a wireless communication system bandwidth; and wherein at least two of the plurality of NB wireless communication channels correspond to portions of the wireless communication system bandwidth outside a set of frequency resources used to transmit Long-Term Evolution (LTE) Primary Synchronization Signals (PSS) and LTE Secondary Synchronization Signals (SSS).

In example 57, the method of example 56, wherein one of the plurality of NB wireless communication channels is a primary NB wireless communication channel, comprising: extracting synchronization information from a Narrowband Synchronization Channel (NB-SCH) transmission; and processing the NB-SCH transmission on the primary NB wireless communication channel.

In example 58, the method of either of examples 56 or 57, comprising: extracting information from an NB-MIB transmission, wherein the NB-MIB transmission is configured to include one or more of: a number of Downlink (DL) NB wireless communication channels available; a location within an LTE wireless communication system bandwidth of each available NB wireless communication channel; a number of antennas available for DL transmissions by the eNB; at least partial scheduling and resource allocation information for a Narrowband System Information Block Type 1 (NB-SIB1); or an indicator identifying at least one NB wireless communication channel as one of an in-band channel deployed within an LTE wireless communication system bandwidth or a stand-alone channel deployed outside the LTE wireless communication system bandwidth.

In example 59, the method of any of examples 56 through 58, comprising: processing a first transmission on a first NB wireless communication channel; and processing a next transmission following the first transmission on a second NB wireless communication channel, the first NB wireless communication channel being different from the second NB wireless communication channel.

In example 60, the method of any of examples 56 through 59, comprising: processing a Narrowband Physical Downlink Control Channel (NB-PDCCH) transmission on a first NB wireless communication channel; extracting a channel assignment for a Narrowband Physical Downlink Shared Channel (NB-PDSCH) transmission from the NB-PDCCH transmission, the channel assignment indicating a second NB wireless communication channel different from the first NB wireless communication channel; and processing the NB-PDSCH transmission on the second NB wireless communication channel.

In example 61, the method of any of examples 56 through 60, wherein one of the NB wireless communication channels is a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidths.

In example 62, the method of any of examples 56 through 61, comprising: processing one or more RRC configuration transmissions to configure the first CIoT device to monitor a default NB for receiving a Narrowband Physical Downlink Control Channel (NB-PDCCH) transmission.

In example 63, the method of any of examples 56 through 62, comprising: extracting an indication of enhanced coverage from the eNB by one of: a number of retransmissions indicated using Layer 1 control for unicast message reception or transmission, a mapping to a repetition level for the first CIoT device, or a value among a set of values mapped to a repetition level of the first CIoT device.

Example 64 provides machine readable storage media having machine executable instructions stored thereon that, when executed, cause one or more processors to perform a method according to any one of examples 56 through 63.

Example 65 provides an apparatus of a Cellular Internet of Things (CIoT) device operable to communicate with an Evolved Node B (eNB) on a wireless network, comprising: means for processing and from on one of a plurality of Narrowband (NB) wireless communication channels, a transmission comprising one of: a Narrowband Primary Synchronization Signal (NB-PSS), a Narrowband Secondary Synchronization Signal (NB-SSS), a Narrowband NB Master Information Block (NB-MIB), or a Narrowband NB System Information Block (NB-SIB); and means for extracting time-and-frequency synchronization and system information from the transmission, wherein the plurality of NB wireless communication channels are within a wireless communication system bandwidth; and wherein at least two of the plurality of NB wireless communication channels correspond to portions of the wireless communication system bandwidth outside a set of frequency resources used to transmit Long-Term Evolution (LTE) Primary Synchronization Signals (PSS) and LTE Secondary Synchronization Signals (SSS).

In example 66, the apparatus of example 65, wherein one of the plurality of NB wireless communication channels is a primary NB wireless communication channel, comprising: means for extracting synchronization information from a Narrowband Synchronization Channel (NB-SCH) transmission; and means for processing the NB-SCH transmission on the primary NB wireless communication channel.

In example 67, the apparatus of either of examples 65 or 66, comprising: means for extracting information from an NB-MIB transmission, wherein the NB-MIB transmission is configured to include one or more of: a number of Downlink (DL) NB wireless communication channels available; a location within an LTE wireless communication system bandwidth of each available NB wireless communication channel; a number of antennas available for DL transmissions by the eNB; at least partial scheduling and resource allocation information for a Narrowband System Information Block Type 1 (NB-SIB1); or an indicator identifying at least one NB wireless communication channel as one of an in-band channel deployed within an LTE wireless communication system bandwidth or a stand-alone channel deployed outside the LTE wireless communication system bandwidth.

In example 68, the apparatus of any of examples 65 through 58, comprising: means for processing a first transmission on a first NB wireless communication channel; and means for processing a next transmission following the first transmission on a second NB wireless communication channel, the first NB wireless communication channel being different from the second NB wireless communication channel.

In example 69, the apparatus of any of examples 65 through 68, comprising: means for processing a Narrowband Physical Downlink Control Channel (NB-PDCCH) transmission on a first NB wireless communication channel; means for extracting a channel assignment for a Narrowband Physical Downlink Shared Channel (NB-PDSCH) transmission from the NB-PDCCH transmission, the channel assignment indicating a second NB wireless communication channel different from the first NB wireless communication channel; and means for processing the NB-PDSCH transmission on the second NB wireless communication channel.

In example 70, the apparatus of any of examples 65 through 69, wherein one of the NB wireless communication channels is a primary NB wireless communication channel aligned with a Long-Term Evolution (LTE) 100 kHz raster, within an offset of +/−2.5 kHz for even LTE system bandwidths, and within an offset of +/−7.5 kHz for odd LTE system bandwidths.

In example 71, the apparatus of any of examples 65 through 70, comprising: means for processing one or more RRC configuration transmissions to configure the first CIoT device to monitor a default NB for receiving a Narrowband Physical Downlink Control Channel (NB-PDCCH) transmission.

In example 72, the apparatus of any of examples 65 through 71, comprising: means for extracting an indication of enhanced coverage from the eNB by one of: a number of retransmissions indicated using Layer 1 control for unicast message reception or transmission, a mapping to a repetition level for the first CIoT device, or a value among a set of values mapped to a repetition level of the first CIoT device.

In example 73, the apparatus of any of examples 1 through 10, 30 through 38, 39 through 47, and 65 through 72, wherein the one or more processors comprise a baseband processor.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A base station (BS) operable to communicate with at least one Cellular Internet-of-Things (CIoT) device on a wireless network, comprising:
    one or more processors to:
        generate a first transmission for a first CIoT device on a first Narrowband Internet-of-Things (NB-IoT) wireless communication channel that occupies only a first single physical resource block (PRB), the first transmission including a set of Narrowband System Information (NB-SI), wherein the set of NB-SI comprises one of a Narrowband Primary Synchronization Signal (NB-PSS) or a Narrowband Secondary Synchronization Signal (NB-SSS);
        generate a second transmission for a second CIoT device on a second NB-IoT wireless communication channel that occupies only a second single PRB, the second transmission including the set of NB-SI; and
        generate at least one of a Long-Term Evolution (LTE) Primary Synchronization Signal (PSS) transmission or an LTE Secondary Synchronization Signal (SSS) transmission for a set of subcarriers corresponding to a set of frequency resources that occupies a plurality of central PRBs within a wireless communication system bandwidth,
        wherein the first NB-IoT wireless communication channel and the second NB-IoT wireless communication channel correspond to portions of the wireless communication system bandwidth different from the set of frequency resources.

2. The BS of claim 1, wherein the first NB-IoT wireless communication channel is a primary NB-IoT wireless communication channel, and wherein the one or more processors are further to:
    generate a Narrowband Synchronization Channel (NB-SCH) transmission on the primary NB-IoT wireless communication channel.

3. The BS of claim 1, wherein the one or more processors are further to:
    generate a Narrowband Physical Broadcast Channel (NB-PBCH) transmission for the primary NB-IoT wireless communication channel, the NB-PBCH transmission carrying a Narrowband Master Information Block (NB-MIB) configured to include at least one of: a number of available Downlink (DL) NB-IoT wireless communication channels; a location within an LTE wireless communication system bandwidth of each available NB wireless communication channel; a number of antennas available for DL transmissions by the BS; at least partial scheduling and resource allocation information for a Narrowband System Information Block Type I (NB-SIB 1); or an indicator identifying at least one NB-IoT wireless communication channel as one of an in-band channel deployed within the LTE wireless communication system bandwidth or a stand-alone channel deployed different from the LTE wireless communication system bandwidth.

4. The BS of claim 1, wherein the one or more processors are further to:
    generate a next transmission for the first CIoT device for an NB-IoT wireless communication channel that is different from the first NB-IoT wireless communication channel and is determined in accordance with a predetermined frequency hopping pattern.

5. The BS of claim 1, wherein the one or more processors are further to:
    generate a Narrowband Physical Downlink Control Channel (NB-PDCCH) transmission for the first CIoT device on the first NB-IoT wireless communication channel, the NB-PDCCH transmission indicating a Narrowband Physical Downlink Shared Channel assignment (NB-PDSCH) on the second NB-IoT wireless communication channel different from the first NB-IoT wireless communication channel.

6. Non-transitory machine readable storage media having machine executable instructions that, when executed, cause one or more processors to perform operations comprising:
    generating for a base station (BS), a first transmission for a first Cellular Internet-of-Things (CIoT) device on a first Narrowband Internet-of-Things (NB-IoT) wireless communication channel that occupies only a first single physical resource block (PRB), the first transmission including a set of Narrowband System Information (NB-SI), wherein the set of NB-SI comprises one of a Narrowband Primary Synchronization Signal (NB-PSS) or a Narrowband Secondary Synchronization Signal (NB-SSS);

generating a second transmission for a second CIoT device on a second NB-IoT wireless communication channel that occupies only a second single PRB, the second transmission including the set of NB-SI; and generating at least one of a Long-Term Evolution (LTE) Primary Synchronization Signal (PSS) transmission or an LTE Secondary Synchronization Signal (SSS) transmission for a set of subcarriers corresponding to a set of frequency resources that occupies a plurality of central PRBs within a wireless communication system bandwidth, wherein the first NB-IoT wireless communication channel and the second NB-IoT wireless communication channel correspond to portions of the wireless communication system bandwidth different from the set of frequency resources, and wherein the NB-PSS is different from the LTE PSS and the NB-SSS is different from the LTE SSS.

7. The machine readable storage media of claim 6, wherein the first NB-IoT wireless communication channel is a primary NB-IoT wireless communication channel, the operations further comprising:

generating a Narrowband Synchronization Channel (NB-SCH) transmission on the primary NB-IoT wireless communication channel.

8. The machine readable storage media of claim 6, the operations further comprising:

generating a Narrowband Physical Broadcast Channel (NB-PBCH) transmission for the primary NB-IoT wireless communication channel, the NB-PBCH transmission carrying a Narrowband Master Information Block (NB-MIB) configured to include at least one of: a number of available Downlink (DL) NB-IoT wireless communication channels; a location within an LTE wireless communication system bandwidth of each available NB-IoT wireless communication channel; a number of antennas available for DL transmissions by the BS; at least partial scheduling and resource allocation information for a Narrowband System Information Block Type 1 (NB-SIB 1); or an indicator identifying at least one NB-IoT wireless communication channel as one of an in-band channel deployed within the LTE wireless communication system bandwidth or a stand-alone channel deployed different from the LTE wireless communication system bandwidth.

9. The machine readable storage media of claim 6, the operations further comprising:

generating a next transmission for the first CIoT device for an NB-IoT wireless communication channel that is different from the first NB-IoT wireless communication channel and is determined in accordance with a predetermined frequency hopping pattern.

10. The machine readable storage media of claim 6, the operations further comprising:

generating a Narrowband Physical Downlink Control Channel (NB-PDCCH) transmission for the first CIoT device on the first NB-IoT wireless communication channel, the NB-PDCCH transmission indicating a Narrowband Physical Downlink Shared Channel assignment (NB-PDSCH) on an NB-IoT wireless communication channel different from the first NB-IoT wireless communication channel.

11. A Cellular Internet of Things (CIoT) device operable to communicate with a base station (BS) on a wireless network, comprising:

one or more processors to:

process, from a first Narrowband Internet-of-Things (NB-IoT) wireless communication channel of at least two of a plurality of NB-IoT wireless communication channels, a first transmission of two transmissions from the BS, each of the two transmissions from the BS generated on a respective NB-IoT wireless communication channel, and each of the two transmissions from the BS comprising one of: a Narrowband Primary Synchronization Signal (NB-PSS), an NB Secondary Synchronization Signal (NB-SSS), a Narrowband Master Information Block (NB-MIB), or a Narrowband System Information Block (NB-SIB); and extract time-and-frequency synchronization and system information from the transmission, wherein the plurality of NB-IoT wireless communication channels are within a wireless communication system bandwidth; and wherein the at least two of the plurality of NB-IoT wireless communication channels each occupy only a respective single physical resource block (PRB) and correspond to portions of the wireless communication system bandwidth different from a set of frequency resources, and wherein the set of frequency resources occupy a plurality of central PRBs and are used to transmit Long-Term Evolution (LTE) Primary Synchronization Signals (PSS) and LTE Secondary Synchronization Signals (SSS).

12. The CIoT device of claim 11, wherein one of the plurality of NB-IoT wireless communication channels is a primary NB-IoT wireless communication channel, and wherein the one or more processors are further to:

extract synchronization information from a Narrowband Synchronization Channel (NB-SCH) transmission; and process the NB-SCH transmission on the primary NB-IoT wireless communication channel.

13. The CIoT device of claim 11, wherein the one or more processors are further to:

extract information from an NB-MIB transmission; and wherein the NB-MIB transmission is configured to include one or more of: a number of available Downlink (DL) NB-IoT wireless communication channels; a location within an LTE wireless communication system bandwidth of each available DL NB-IoT wireless communication channel; a number of antennas available for DL transmissions by the BS; at least partial scheduling and resource allocation information for a Narrowband System Information Block Type 1 (NB-SIB 1); or an indicator identifying at least one NB-IoT wireless communication channel as one of an in-band channel deployed within the LTE wireless communication system bandwidth or a stand-alone channel deployed different from the LTE wireless communication system bandwidth.

14. The CIoT device of claim 11, wherein the one or more processors are further to:

process the first transmission on the first NB-IoT wireless communication channel; and process a next transmission following the first transmission on a second NB-IoT wireless communication channel, the first NB-IoT wireless communication channel being different from the second NB-IoT wireless communication channel.

15. The CIoT device of claim 11, wherein the one or more processors are further to:
process a Narrowband Physical Downlink Control Channel (NB-PDCCH) transmission on the first NB-IoT wireless communication channel;
extract a channel assignment for a Narrowband Physical Downlink Shared Channel (NB-PDSCH) transmission from the NB-PDCCH transmission, the channel assignment indicating a second NB-IoT wireless communication channel different from the first NB-IoT wireless communication channel; and
process the NB-PDSCH transmission on the second NB-IoT wireless communication channel.

16. The CIoT device of claim 11, wherein the one or more processors are further to:
process a next transmission for an NB-IoT wireless communication channel that is different from the one of the plurality of NB-IoT wireless communication channels and is determined in accordance with a predetermined frequency hopping pattern.

17. Non-transitory machine readable storage media having machine executable instructions that, when executed, cause one or more processors to perform operations comprising:
processing, for a Cellular Internet-of-Things (CIoT) device, and from a first Narrowband Internet-of-Things (NB-IoT) wireless communication channel of at least two of a plurality of NB-IoT wireless communication channels, a first transmission of two transmissions from a base station (BS), each of the two transmissions from the BS generated on a respective NB-IoT wireless communication channel, and each of the two transmissions from the BS comprising one of: a Narrowband Primary Synchronization Signal (NB-PSS), a Narrowband Secondary Synchronization Signal (NB-SSS), a Narrowband NB Master Information Block (NB-MIB), or a Narrowband NB System Information Block (NB-SIB); and
extracting time-and-frequency synchronization and system information from the transmission,
wherein the plurality of NB-IoT wireless communication channels are within a wireless communication system bandwidth; and
wherein the at least two of the plurality of NB-IoT wireless communication channels each occupy only a respective single physical resource block (PRB) and correspond to portions of the wireless communication system bandwidth different from a set of frequency resources, and wherein the set of frequency resources occupy a plurality of central PRBs and are used to transmit Long-Term Evolution (LTE) Primary Synchronization Signals (PSS) and LTE Secondary Synchronization Signals (SSS).

18. The machine readable storage media of claim 17, wherein one of the plurality of NB-IoT wireless communication channels is a primary NB-IoT wireless communication channel, the operations further comprising:
extracting synchronization information from a Narrowband Synchronization Channel (NB-SCH) transmission; and
processing the NB-SCH transmission on the primary NB-IoT wireless communication channel.

19. The machine readable storage media of claim 17, the operations further comprising:
extracting information from an NB-MIB transmission,
wherein the NB-MIB transmission is configured to include one or more of: a number of available Downlink (DL) NB wireless communication channels; a location within an LTE wireless communication system bandwidth of each available NB-IoT wireless communication channel; a number of antennas available for DL transmissions by the BS; at least partial scheduling and resource allocation information for a Narrowband System Information Block Type 1 (NB-SIB 1); or an indicator identifying at least one NB-IoT wireless communication channel as one of an in-band channel deployed within the LTE wireless communication system bandwidth or a stand-alone channel deployed different from the LTE wireless communication system bandwidth.

20. The machine readable storage media of claim 17, the operations further comprising:
processing the first transmission on the first NB-IoT wireless communication channel; and
processing a next transmission following the first transmission on a second NB-IoT wireless communication channel, the first NB-IoT wireless communication channel being different from the second NB-IoT wireless communication channel.

21. The machine readable storage media of claim 17, the operations further comprising:
processing a Narrowband Physical Downlink Control Channel (NB-PDCCH) transmission on the first NB-IoT wireless communication channel;
extracting a channel assignment for a Narrowband Physical Downlink Shared Channel (NB-PDSCH) transmission from the NB-PDCCH transmission, the channel assignment indicating a second NB-IoT wireless communication channel different from the first NB-IoT wireless communication channel; and
processing the NB-PDSCH transmission on the second NB-IoT wireless communication channel.

22. The machine readable storage media of claim 17, the operations further comprising:
processing, for the CIoT device, a next transmission for an NB-IoT wireless communication channel that is different from the one of the plurality of NB-IoT wireless communication channels and is determined in accordance with a predetermined frequency hopping pattern.

* * * * *